(12) United States Patent
Amamori

(10) Patent No.: US 6,502,858 B2
(45) Date of Patent: Jan. 7, 2003

(54) AIRBAG DEVICE WITH TEARABLE STRAP

(75) Inventor: Ichiro Amamori, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/835,843

(22) Filed: Apr. 17, 2001

(65) Prior Publication Data

US 2001/0035639 A1 Nov. 1, 2001

(30) Foreign Application Priority Data

Apr. 25, 2000 (JP) ........................................ 2000-124325

(51) Int. Cl.$^7$ .............................................. B60R 21/16
(52) U.S. Cl. ................................ 280/743.2; 280/743.1; 280/739
(58) Field of Search ........................ 280/743.1, 743.2, 280/739, 742

(56) References Cited

U.S. PATENT DOCUMENTS

| 5,016,913 | A | * | 5/1991 | Nakajima et al. ............ 280/738 |
| 5,044,663 | A | * | 9/1991 | Seizert ..................... 280/730.1 |
| 5,249,825 | A | * | 10/1993 | Gordon et al. ............... 280/743 |
| 5,282,646 | A | * | 2/1994 | Melvin et al. ............... 280/729 |
| 5,308,113 | A | * | 5/1994 | Moriset .................... 280/743.2 |
| 5,310,214 | A | * | 5/1994 | Cuevas ....................... 280/729 |
| 5,362,101 | A | * | 11/1994 | Sugiura et al. ........... 280/743.2 |
| 5,489,119 | A | * | 2/1996 | Prescaro et al. .......... 280/743.2 |
| 5,678,858 | A |   | 10/1997 | Nakayama et al. |
| 5,746,447 | A | * | 5/1998 | Dyer et al. ............... 280/743.2 |
| 5,762,367 | A | * | 6/1998 | Wolanin ..................... 280/736 |
| 5,813,696 | A | * | 9/1998 | Hill ......................... 280/743.2 |
| 5,871,231 | A | * | 2/1999 | Richards et al. ............ 280/735 |
| 5,997,037 | A | * | 12/1999 | Hill et al. ................ 280/743.2 |
| 6,042,147 | A | * | 3/2000 | Nishijima et al. ......... 280/743.1 |
| 6,073,959 | A | * | 6/2000 | Heinz et al. ................ 280/729 |
| 6,224,101 | B1 | * | 5/2001 | Nishijima et al. ........ 280/743.2 |
| 6,250,677 | B1 | * | 6/2001 | Fujimura ................. 280/743.2 |

FOREIGN PATENT DOCUMENTS

| JP | 01247242 A | * | 10/1989 |
| JP | 02037059 A | * | 2/1990 |
| JP | 05201301 A | * | 8/1993 |
| JP | 06064490 A | * | 3/1994 |
| JP | 06/286541 |   | 10/1994 |
| JP | 6-286543 |   | 10/1994 |
| JP | 7-69149 |   | 3/1995 |
| JP | 7-329665 |   | 12/1995 |
| JP | 7-329696 |   | 12/1995 |
| JP | 2002-79905 |   | 3/2002 |

* cited by examiner

*Primary Examiner*—Paul N. Dickson
*Assistant Examiner*—Deanna Draper
(74) *Attorney, Agent, or Firm*—Kanesaka & Takeuchi

(57) ABSTRACT

An airbag device can stabilize an impact absorbing action when an airbag deploys. In the airbag, a front surface portion is coupled with a rear surface portion by straps so that a deployed-shape of the airbag is restricted when the airbag expands. Each of the straps has a tearable portion having a sufficient length. When the internal pressure of the airbag exceeds a predetermined pressure, the tearable portions are torn so as to increase the lengths of the straps, whereby the restriction of the airbag is eased. The internal pressure of the airbag is sufficiently increased before an occupant plunges to the airbag to smoothly absorb an impact simultaneously with the plunge of the occupant, and thereafter, the impact is smoothly absorbed as well.

9 Claims, 15 Drawing Sheets

AIRBAG DEVICE WITH TEARABLE STRAP

BACKGROUND OF THE INVENTION AND RELATED ART STATEMENT

The present invention relates to an airbag device for protecting an occupant by deploying an airbag in an emergency, such as collision of a vehicle, and the like, and more particularly, to an airbag device having means for restricting a shape of an airbag when it is expanding.

As known well, an airbag device for an automobile includes an airbag and an inflator for inflating the airbag, and allows the inflator to eject gas in an emergency, such as collision of an automobile, and the like, so that the gas is supplied into the airbag and the airbag is deployed in a compartment.

There is known as this type of the airbag device an airbag device using a tear seam, a strap, an adhesive, and the like, which are broken or exfoliated with a predetermined tensile strength, as regulation means for regulating a shape of an airbag when it expands. In this airbag device, the volume of the airbag is reduced by, for example, coupling panels of the airbag coupled with each other by the regulation means at the beginning of expansion of the airbag, and when the internal pressure of the airbag reaches at least a predetermined pressure, the volume of the airbag is increased by breaking the regulation means.

An impact applied to an occupant is absorbed by breaking the tear seal and the strap or by exfoliating the adhesive.

Accordingly, it is an object of the present invention to provide an airbag device capable of easily stabilizing an impact absorbing action when an airbag deploys.

SUMMARY OF THE INVENTION

An airbag device of the present invention includes a folded airbag, an inflator for expanding the airbag, and restriction means for restricting a deployed-shape of the airbag, wherein when the inflator is actuated, the airbag is expanded until it is formed in a shape restricted by the restriction means. Then the airbag restricted by the restriction means is released or eased by an increase of the internal pressure of the airbag caused thereafter, and the airbag is largely expanded. In this respect, the restriction means is a strap, and the airbag is released or eased by tearing the strap so as to increase the length thereof.

In the airbag device of the present invention arranged as described above, the strap is composed of a base cloth formed of a belt-shaped cloth, synthetic resin or the like, which can be torn only in a lengthwise direction, and formed in a bifurcated-shape by being cut from the vicinity of an end to a mid-portion thereof along the lengthwise direction.

Two small, slender straps each having a predetermined length are formed on the one half side of the strap. Further, the other half side of the strap is arranged as a tearable portion which has a sufficient length and can be torn from a bifurcated portion of these two small straps along the lengthwise direction when the extreme ends of these small straps are pulled in a direction where they are separated from each other with a predetermined tension.

The strap restricts a deployed-shape of the airbag by coupling end sides of these small straps with confronting portions of the airbag, respectively. Further, when the internal pressure of the airbag reaches at least a predetermined pressure at a time it expands, the tearable portion is torn so as to increase the length of the strap by pulling the end sides of the respective small straps in a direction where they are separated from each other with a tension having at least a predetermined value.

In the airbag device of the present invention including the airbag, the deployed-shape of which is restricted by the strap arranged as described above, when the internal pressure of the airbag is equal to or less than the predetermined pressure at a time the airbag is expanded by actuating the inflator in an emergency, such as collision of an automobile, and the like, the airbag has a small apparent volume because the deployed-shape thereof is restricted by the strap, which causes the airbag to rapidly expand. Then, when the internal pressure of the airbag exceeds the predetermined pressure, the airbag pulls the end sides of the respective small straps of the strap with the tension having at least the predetermined value and the tearable portion is torn so as to increase the length of the strap, whereby the airbag restricted by the strap is released or eased and can be more largely expanded.

At that time, the tearable portion has the sufficient length and a load having at least a predetermined value is necessary to tear the tearable portion, and the load in turn acts as a resistance force against the expansion of the airbag (hereinafter, the resistance force is sometimes called a "tear resistance force"). Therefore, even if the internal pressure of the airbag exceeds the predetermined pressure, it is prevented that restriction of the airbag is instantaneously released to suddenly expand the airbag, and that the internal pressure of the airbag is rapidly changed accordingly. Further, the internal pressure of the airbag is prevented from being excessively increased because the tearable portion is continuously torn so as to increase the length of the strap and the volume of the airbag is increased even after the internal pressure of the airbag has reached at least the predetermined pressure. As a result, the airbag device of the present invention can smoothly and sufficiently absorb an impact.

DETAILED DESCRIPTION OF PREFERRED EMBODIMENTS

Figure 1:
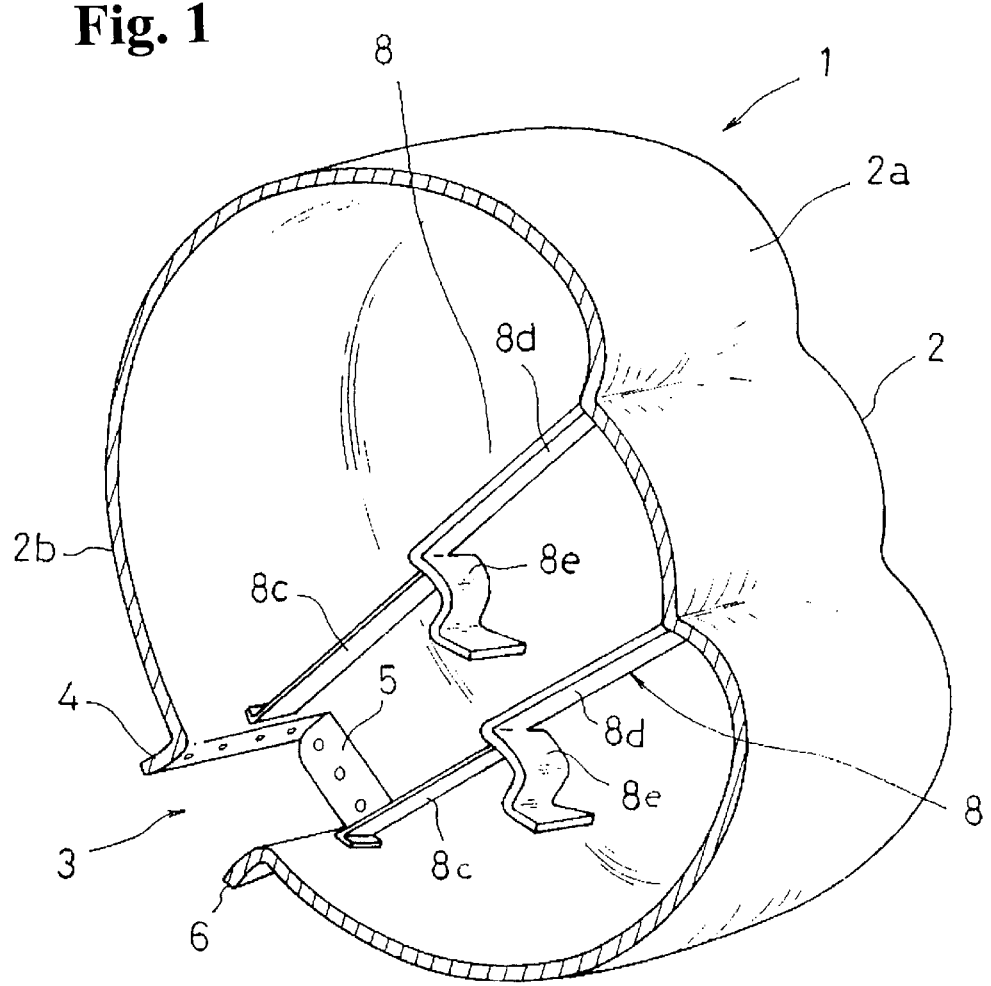
FIG. 1 is a sectional perspective view of an airbag device according to an embodiment of the present invention.
Figure 2A:
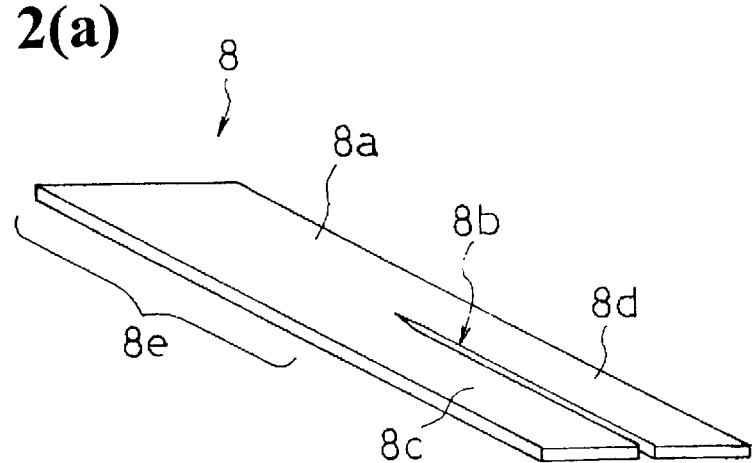
FIGS. 2(a)–2(c) are views explaining an arrangement of a strap of the airbag device of FIG. 1.
Figure 2B:
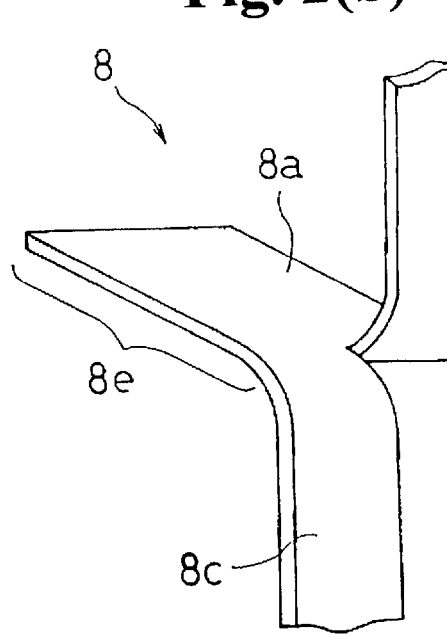
Figure 2C:
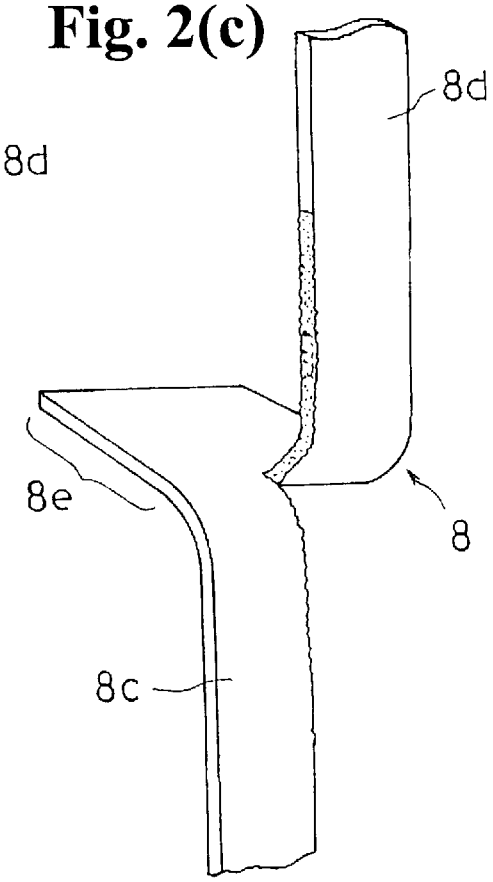

Embodiments of the present invention will be described below with reference to the drawings. FIG. 1 is a sectional perspective view showing an airbag used in an airbag device according to an embodiment of the present invention, and FIGS. 2(a)–2(c) are views explaining an arrangement of a strap of the airbag device.

The airbag device 1 includes a passenger's airbag 2. The airbag 2 has a front surface portion 2a facing an occupant and a rear surface portion 2b located on the opposite side of the front surface portion 2a. An opening 3 for receiving gas from an inflator (not shown) is formed at the rear end portion of the airbag 2, that is, in the vicinity of a center of the rear surface portion 2b. Flaps 4, 5, 6 and 7 (flap 7 is not shown) are disposed around a periphery of the opening 3 to couple the airbag 2 with an airbag accommodation container (not shown).

The front surface portion 2a of the airbag 2 is coupled with the rear surface portion 2b thereof through straps 8. As shown in FIG. 2, each strap 8 is composed of a belt-shaped base cloth 8a having a sufficient strength. The base cloth 8a is composed of a cloth, resin or the like which can be torn only along a lengthwise direction thereof when a tensile strength having at least a predetermined value is applied thereto. The base cloth 8a has a slit 8b which is formed by cutting the base cloth 8a from the vicinity of a center of a side edge on one end side thereof along a lengthwise direction by a predetermined length. The slit 8b divides one half side of the base cloth 8a into a first slender, small strap (strap section) 8c and a second slender, small strap (strap section) 8d each having a predetermined length. The other half side of the base cloth 8a is arranged as a tearable portion 8e which permits the base cloth 8a to be torn along the lengthwise direction thereof from an end of the slit 8b by pulling the first and second small straps 8c and 8d by the tension having at least the predetermined value in a direction where they are separated from each other.

In the strap 8, an end of the first small strap 8c is coupled with the periphery of the opening 3 on an inner peripheral surface of the rear surface portion 2b of the airbag 2, whereas an end of the second small strap 8d is coupled with a portion in the vicinity of a center of the front surface portion 2a on an inner peripheral surface of the front surface portion 2a of the airbag 2.

In the airbag 2 in which the front surface portion 2a is coupled with the rear surface portion 2b by the straps 8 as described above, when the inner pressure of the airbag is equal to or less than a predetermined pressure when the airbag expands, a tension, which acts on the strap (that is, a force for pulling the first small strap 8c and the second small strap 8d in a direction where they are separated from each other, the force being generated when the front surface portion 2a and the rear surface portion 2b are separated from each other as the airbag 2 expands, and the above tension is sometimes called a "tear tension"), has the predetermined value or less. Thus, the lengths of the straps 8 are not increased such that the tearable portions 8e are torn. As a result, the straps 8 restrict the forward movement of the front surface portion 2a of the airbag 2 in a state that they are stretched tightly in the interior of the airbag 2 while maintaining the initial lengths thereof (note that the term "length" of the strap 8 used here means the distance between the ends (portions coupled with the airbag 2) of the first and second small straps 8c and 8d when they are pulled by the expanded airbag 2 and stretched tightly in the interior of the airbag 2, which is similarly applicable to the description that will be made hereinafter). Then, when the inner pressure of the airbag exceeds the predetermined pressure, the tension of the strap 8 has at least the predetermined value and the tearable portion 8e is torn from the end of the slit 8b in the lengthwise direction of the strap 8, which causes the ends of the first and second small strap 8c and 8d to separate from each other. Accordingly, the lengths of the straps 8 are increased and restriction of the airbag 2 is released or eased, whereby the front surface portion 2a of the airbag 2 can be more enlarged forward (toward an occupant side).

Note that the straps 8 are not improperly broken when the airbag expands because the tearable portions 8e have the sufficient lengths and can be torn only along the lengthwise direction.

Figure 3:
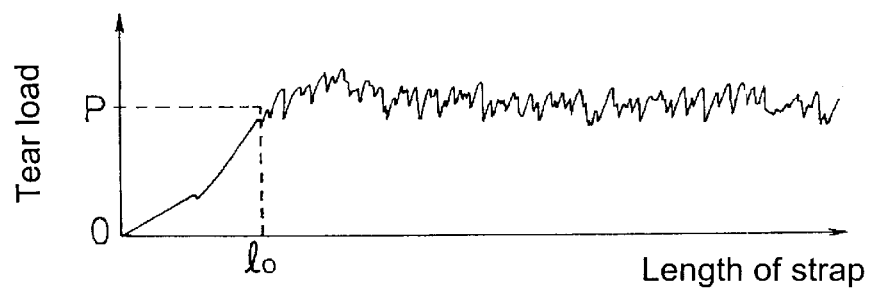
FIG. 3 is a graph showing a relationship between a tear load and a strap length of the strap of FIGS. 2(a)–2(c)

FIG. 3 is a graph showing a relationship between a tear load necessary to tear the strap 8 and an amount of increase of the length of the strap 8. In FIG. 3, reference letter lo denotes the length of the strap 8 in a state where it is stretched tightly, and reference letter P denotes a load (hereinafter, also referred to as "tear load") necessary to tear the tearable portion 8e of the strap 8 from the above state. It can be found from the graph that the tearable portion 8e of the strap 8 is continuously torn with a substantially constant tear load after the tear load reaches a predetermined value P and the tearable portion 8e begins to be torn. That is, the graph of FIG. 3 shows that, in the airbag 2 restricted by the strap 8, the tearable portion 8e is torn when the internal pressure of the airbag exceeds the predetermined pressure and a tension acting on the strap 8 reaches a value P, and, as a result, the length of the strap 8 is increased and the front surface portion 2a of the airbag 2 can be more enlarged forward. The graph of FIG. 3 further shows that the tearable portion 8e is continuously torn thereafter as the front surface portion 2a of the airbag 2 moves forward and that the front surface portion 2a is not instantaneously and perfectly released from the restriction of the strap 8 even after the tearable portion 8e begins to tear because a tear resistant force corresponding to the tear load P acts on the front surface portion 2a.

In the airbag 2 restricted by the strap 8 arranged as described above, the flaps 4 to 7 disposed around a peripheral edge portion of the opening 3 formed at the rear end of the airbag 2 are coupled with a peripheral edge portion of an opening (not shown) of the airbag accommodation container, respectively. The inflator is disposed in the container, and gas generated from the inflator is introduced into the airbag 2 through these openings. The airbag 2 is accommodated in the container by being folded. Then, the airbag device 1 is constructed by mounting a module cover (not shown) so as to cover the opening of the container. The airbag device 1 is applied as the passenger's airbag device and installed in an instrument panel of an automobile (not shown).

In an emergency, such as collision of an automobile and the like, the airbag device 1 expands the airbag 2 by actuating the inflator. Then, the airbag 2 is expanded by gas from the inflator and deploys in a compartment by pushing and opening the module cover. At that time, an upper half of a body of an occupant (portion from a waist to a head) on an passenger's seat moves forward in an automobile as a whole, and then, the upper portion of the body falls down in a forward direction of the automobile.

When the internal pressure of the airbag is equal to or less than the predetermined pressure at the beginning of expansion, the airbag 2 has a small apparent volume because the forward expansion of the front surface portion 2a is restricted by the straps 8, to cause the airbag to expand rapidly. Further, since the pressure of gas from the inflator is entirely consumed to expand a side peripheral portion of the airbag 2, the side peripheral portion of the airbag 2 is greatly expanded outwardly. As a result, the lower portion, in particular, of the side peripheral portion of the airbag 2 which has been greatly expanded receives the lower portion (waist and stomach) of the upper half of the body of the occupant at an earlier time so as to prevent the movement of the overall upper half of the body of the occupant in the forward direction of the automobile. When the internal pressure of the airbag exceeds the predetermined pressure, the length of the strap 8 is increased by the tearing of the tearable portion 8e so that the restricted front surface portion 2a of the airbag 2 is eased. With this operation, the front surface portion 2a of the airbag 2 is swelled or enlarged forward and receives the upper portion (waist and head) of the upper half of the body of the occupant as well as the apparent volume of the airbag 2 is increased as the front surface portion 2a is enlarged, whereby the airbag 2 absorbs an impact without an excessive increase of the internal pressure thereof.

Operation of the airbag device of the present invention will be described below with reference to FIGS. 4(*a*) and 4(*b*) by comparing the airbag device 1 with an airbag device including an airbag, the deployed-shape of which is restricted by a conventional strap arranged to be broken when the internal pressure of the airbag reaches at least a predetermined pressure.

Figure 4A:
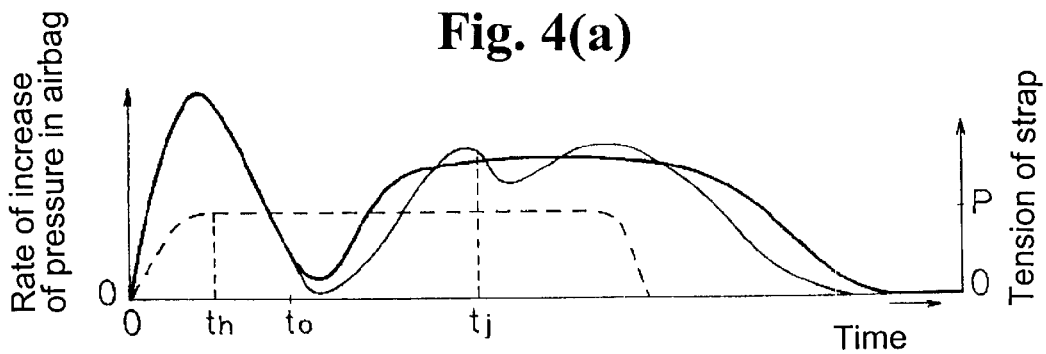
FIGS. 4(a) and 4(b) are views explaining actions of the airbag device of the present invention and a conventional airbag device.
Figure 4B:
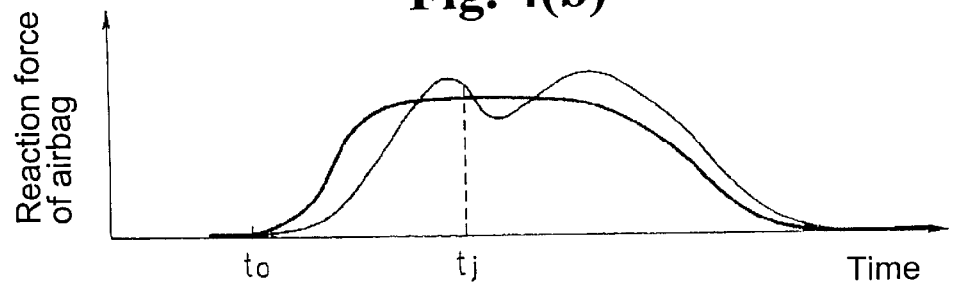

FIG. 4(*a*) is a graph showing an increase of an internal pressure of the airbag, which changes as time passes, when the airbag expands, and FIG. 4(*b*) is a graph showing a reaction force, which changes as time passes, and which is received by an occupant from the airbag. In the respective graphs shown in FIGS. 4(*a*) and 4(*b*), a solid thick line shows a change of the mode of the airbag device 1 of the present invention, and a solid thin line shows a change of the mode of the airbag device including the convention al strap (hereinafter, this airbag device is simply referred to as a "conventional airbag device" sometimes). Further, in FIG. 4(*a*), a broken line shows a tension, which changes as time passes, acting on the strap 8 of the airbag device 1 of the present invention (hereinafter, the tension is simply referred to as a "strap tension" sometimes).

As shown by the graphs of FIGS. 4(*a*) and 4(*b*), in the conventional airbag device, the internal pressure of the airbag rapidly increases just after the inflator is actuated and the airbag expands rapidly accordingly. Then, an occupant plunges to the airbag at a time to, so that the internal pressure of the airbag more increases rapidly thereafter, and the strap is broken at a time tj.

It should be noted that the strap of the conventional airbag device is arranged such that it is ordinarily broken by the internal pressure of the airbag which is increased when the occupant plunges to the airbag and the volume of the airbag is increased thereby and that the strap has a relatively long length to prevent it from being broken when the internal pressure of the airbag is increased by gas ejected from the inflator. Therefore, the airbag of the conventional airbag device is not perfectly expanded before the occupant plunges to the airbag, and thus the airbag may have an insufficient internal pressure.

As a result, in the conventional airbag device, the internal pressure of the airbag must be further increased from a time at which the occupant plunges to the airbag to a time at which the strap breaks, which makes it impossible to absorb an impact when the occupant plunges to the airbag.

In contrast, the airbag device 1 of the present invention is arranged such that the strap 8 has a relatively short length and the tearable portion 8e begins to tear at a point th before the occupant plunges to the airbag, at a stage where the internal pressure of the inflator is being increased by the inflator. That is, in the airbag device 1 of the present invention, the internal pressure of the airbag reaches the predetermined pressure, at which the tearable portion 8e begins to tear, so that it is restricted by the strap 8 at a time earlier than that of the conventional airbag device, and the restriction of the airbag 2 is eased. Thereafter, the tearable portion 8e is continuously torn by a gas pressure from the inflator as well as the volume of the airbag is increased, so that the internal pressure of the airbag is maintained sufficiently without increasing excessively. As a result, it is possible for the airbag device 1 of the present invention to provide the occupant with a sufficient reaction force so as to receive the occupant when the occupant plunges to the airbag 2.

Further, in the conventional airbag device, the volume of the airbag is instantaneously increased simultaneously with that the occupant plunges to the airbag and restriction of the airbag is released by breakage of the strap, so that the internal pressure of the airbag is rapidly reduced. At that time, since the reaction force provided to the occupant by the airbag is also rapidly reduced, the occupant plunges forward until the occupant can obtain a sufficient reaction force from the airbag again. Thus, the airbag absorbs an impact very unstably.

In contrast, sine the tearable portion 8e of the strap 8 has the sufficient length in the airbag device 1 of the present invention, the tearable portion 8e is continuously torn even after the occupant plunges to the airbag 2. Accordingly, the internal pressure of the airbag does not rapidly change, and an impact can be very smoothly and stably absorbed from a time the occupant plunges to the airbag till a time the absorption of the impact is completed.

In the embodiment, while the straps are disposed in the interior of the airbag so as to couple the front surface portion of the airbag with the back surface portion thereof, the disposition of the straps is not limited thereto in the airbag device of the present invention. Other embodiments of the airbag device of the present invention will be described below with reference to FIGS. 5 to 10.

Figure 5:
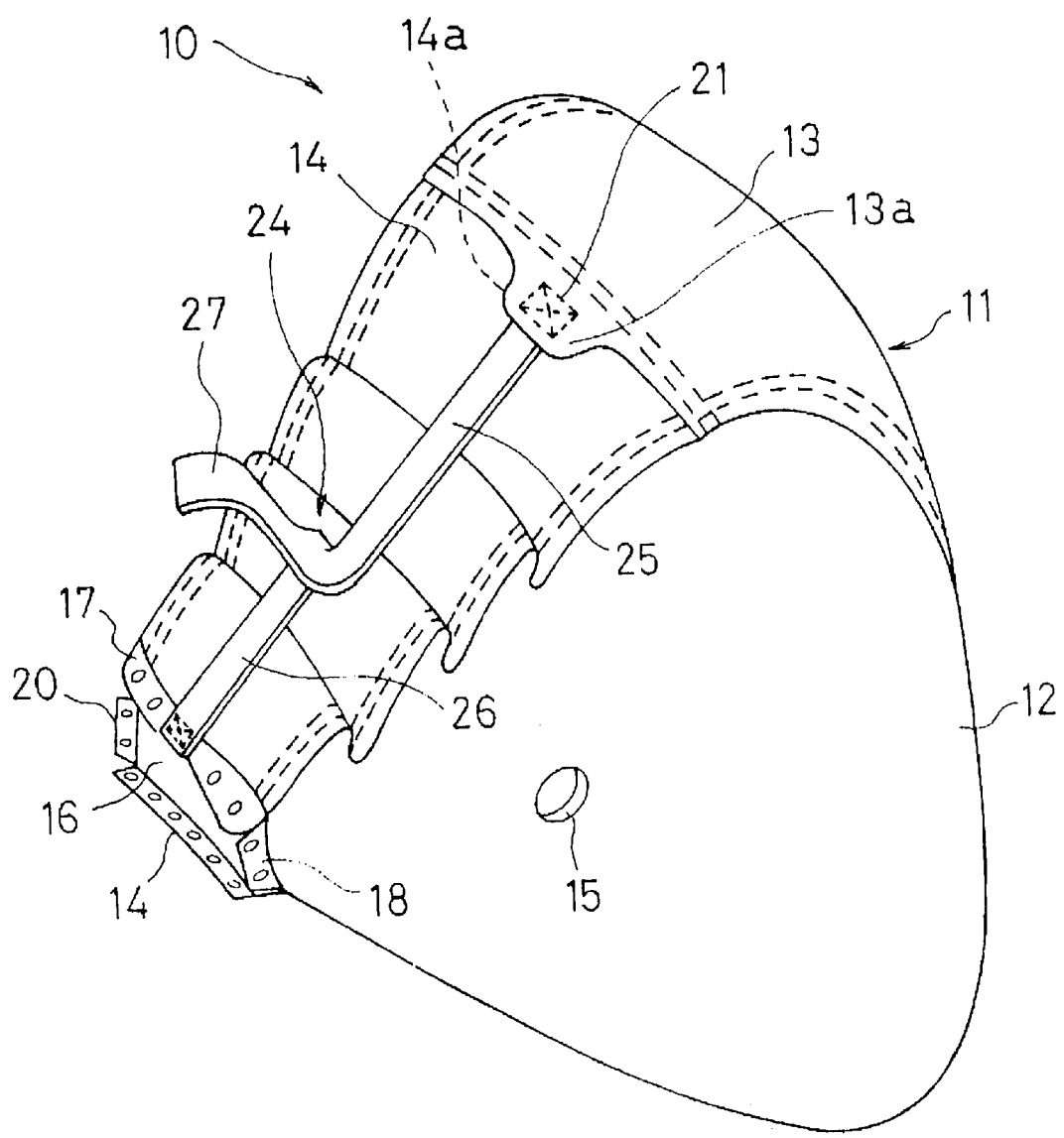
FIG. 5 is a perspective view of an airbag portion of an airbag device according to a second embodiment of the present invention when the airbag portion is restricted.
Figure 6:
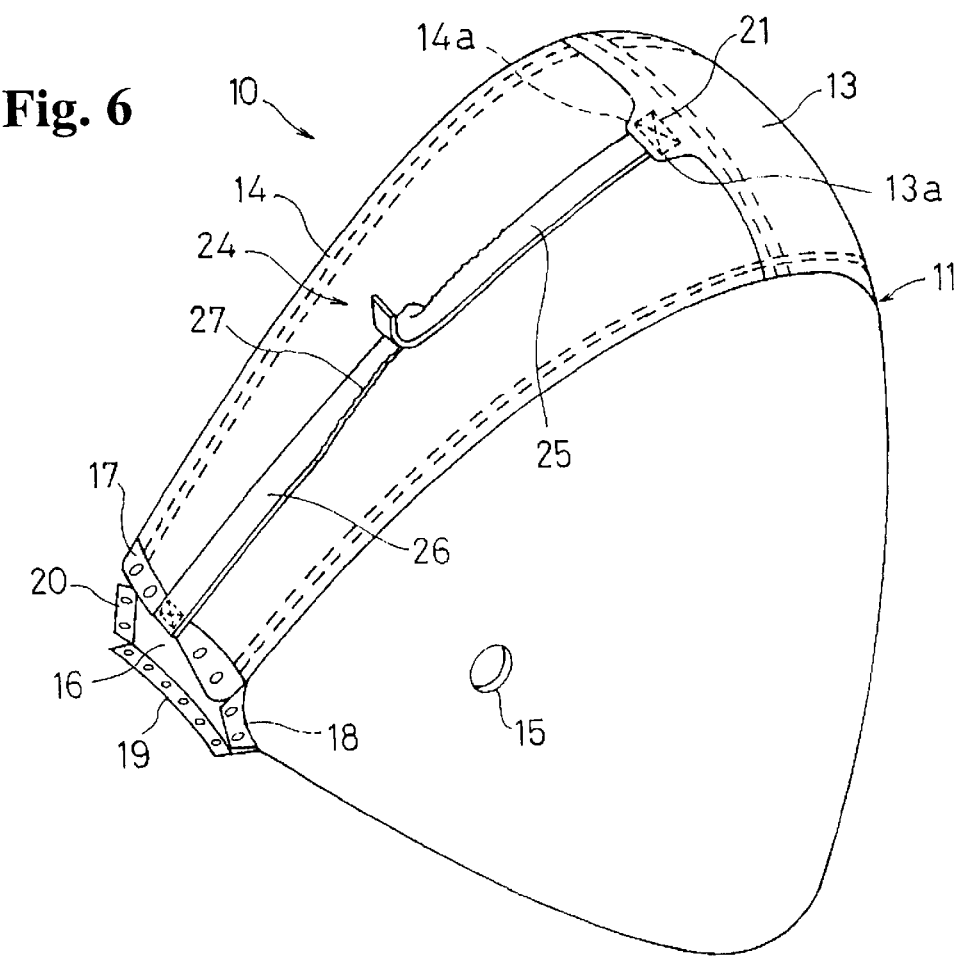
FIG. 6 is a perspective view of the airbag portion of FIG. 5 when the restriction thereof is eased.
Figure 7:
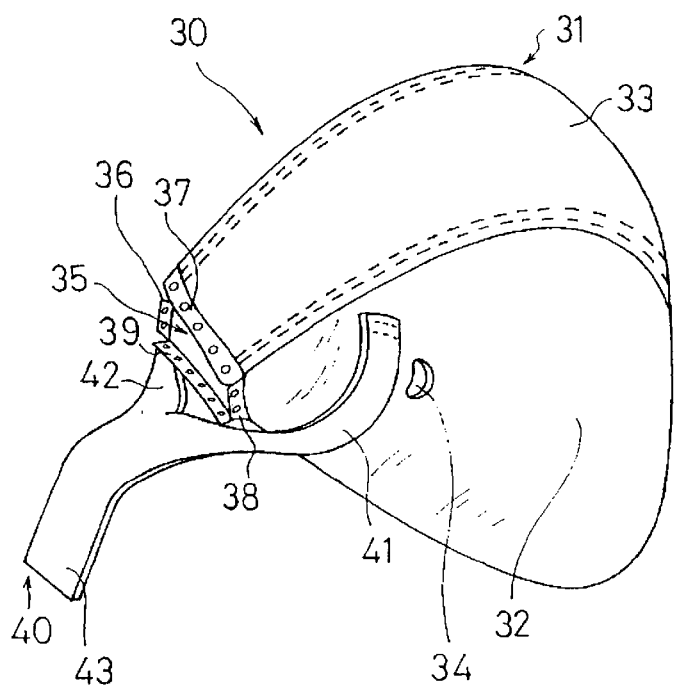
FIG. 7 is a perspective view of an airbag portion of an airbag device according to a third embodiment of the present invention when the airbag portion is restricted.
Figure 8:
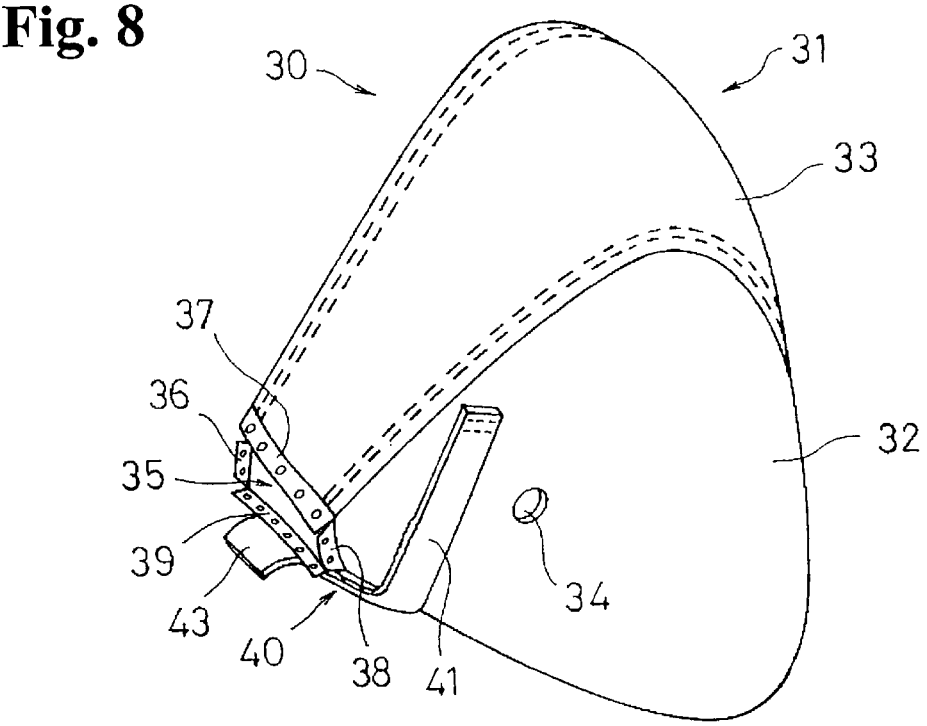
FIG. 8 is a perspective view of the airbag portion of FIG. 7 when the restriction thereof is eased.
Figure 9:
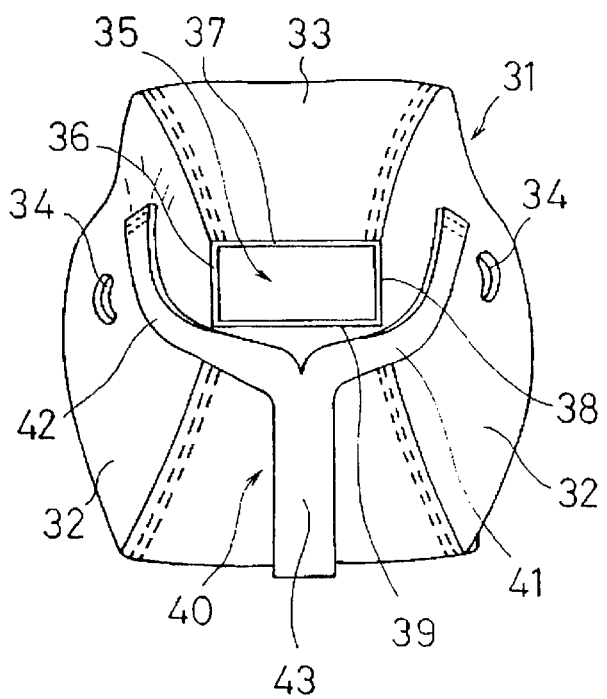
FIG. 9 is a rear view of the airbag portion of FIG. 7.
Figure 10:
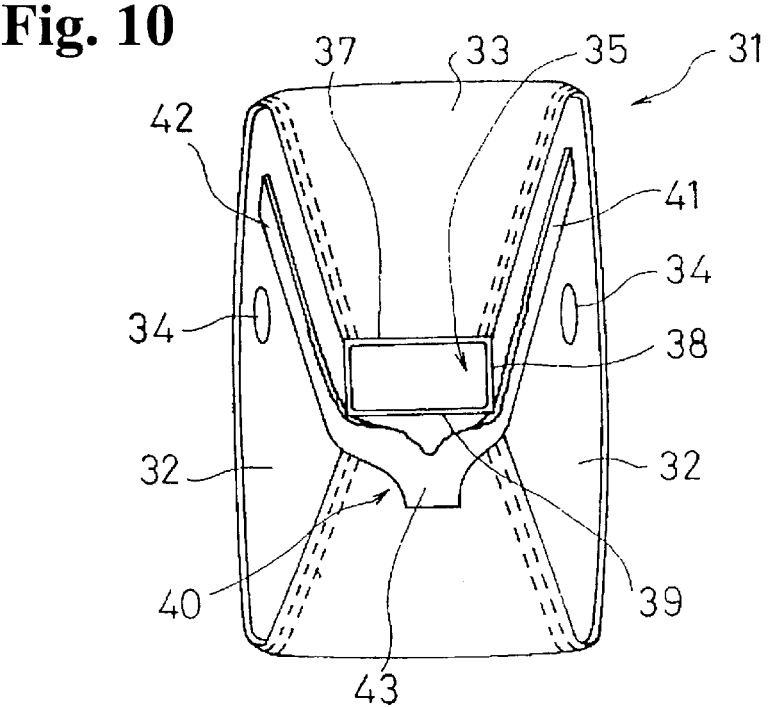
FIG. 10 is a rear view of the airbag portion of FIG. 8.

FIG. 5 is a perspective view of an airbag portion of the airbag device according to another embodiment of the present invention when the airbag portion is restricted; FIG. 6 is a perspective view of the airbag of FIG. 5 when the restriction of the airbag portion is eased; FIG. 7 is a perspective view of an airbag portion of an airbag device according to still another embodiment of the present invention; FIG. 8 is a perspective view of the airbag portion of FIG. 7 when the restriction thereof is eased; and FIGS. 9 and 10 are rear views of the airbag portions of FIGS. 7 and 8, respectively.

The airbag device 10 of FIG. 5 includes an airbag 11 for a passenger. The airbag 11 is made by sewing, and includes a pair of side panels 12, a first front panel 13, and a second front panel 14 together. A vent hole 15 is formed in each of the side panels 12. An opening 16 is formed in a rear portion of the airbag 11 to receive gas from an inflator (not shown). Flaps 17, 18, 19 and 20 are disposed around a periphery of the opening 16 to couple the airbag 11 with a container (not shown).

Flaps 13a and 14a extend from an upper rear edge of the first front panel 13 and from a front edge of the second front panel 14, and an end of a first small strap 25 of a strap 24, which will be described later, is sewn to the flaps 13a and 14a. Reference numeral 21 denotes a thread for sewing the strap 24 to the flaps 13a and 14a.

The strap 24 is formed in a belt-shape having a sufficient length similar to the strap 8 of the above-mentioned embodiment. One half side of the strap 24 is formed in a bifurcated-shape composed of the first small strap 25 and a second small strap 26 each having a predetermined length. The other half side thereof is arranged as a tearable portion 27 which can be torn along a lengthwise direction so as to increase the length of the strap 24 by pulling the first and second small straps 25 and 26 in a direction where they are separated from each other with a tension having at least a predetermined value.

The end of the second small strap 26 of the strap 24 is sewn to the flap 17 at the rear portion of the airbag 11.

In the airbag 11 arranged as described above, the flaps 17 to 20 disposed around the peripheral edge portion of the opening 16 formed at the rear end of the airbag 11 are coupled with a peripheral edge portion of an opening (not shown) of the airbag accommodation container, respectively, similar to the airbag 2 of the above-mentioned airbag device 1. The inflator is disposed in the container, and gas generated from the inflator is introduced into the airbag 11 through these openings. The airbag 11 is accommodated in the container by being folded. The airbag device 10 is constructed by mounting a module cover (not shown) so as to cover the opening of the container. The airbag device 10 is used as an passenger's seat airbag device and installed in an instrument panel of an automobile (not shown). Then, in an emergency, such as collision of an automobile, and the like, the airbag device 10 expands the airbag by causing the inflator to eject gas and deploys the airbag in a compartment.

When the internal pressure of the airbag is equal to or less than a predetermined pressure at the beginning of expansion of the airbag, the tearable portion 27 is not torn and the strap 24 couples the front edge of the second front panel 14 with the flap 17 at the rear end thereof at a predetermined interval so that the airbag 11 is deployed in a shape shown in FIG. 5 with the deployment of the second front panel restricted. At that time, the airbag 11 has a small apparent volume, which causes the airbag 11 to rapidly expand. Then, since a gas pressure from the inflator is entirely consumed to expand the lower portion of the airbag 11 which is not restricted at all, the lower portion of the airbag 11 is greatly expanded at an earlier time. As a result, the lower portion of the airbag 11 receives the lower portion (waist and stomach) of the upper half of the body of an occupant so as to prevent the movement of the occupant in a forward direction. Further, when the internal pressure of the airbag exceeds the predetermined pressure, a tension acting on the strap 24 has at least a predetermined value. Thus, the tearable portion 27 is torn so as to increase the length of the strap 24 and the restriction of the second front panel 14 is eased to thereby permit the second front panel 14 to deploy. As a result, the airbag 11 greatly expands forward as shown in FIG. 6 as well as the internal pressure of the airbag is reduced and the airbag 11 receives the upper portion (head and chest) of the occupant and absorbs an impact.

At that time, the first front panel 13 of the airbag 11 is relatively slowly moved forward because the sudden forward movement thereof is prevented by a tear resistant force of the strap 24.

Note that the airbag device 10 is also arranged such that the strap 24 has a relatively short initial length as well as the tearable portion 27 begins to tear before the occupant plunges to the airbag 11. Accordingly, the internal pressure of the airbag is sufficiently increased before the occupant plunges to the airbag 11 as well as the airbag 11 can reliably and smoothly begin to absorb the impact at the time the occupant plunges to the airbag 11. Further, since the tearable portion 27 has the sufficient length, the internal pressure of the airbag is prevented from being excessively increased because the tearable portion 27 is continuously torn even after the occupant plunges to the airbag 11. Thus, the airbag device 10 arranged as described above can also protect the occupant by sufficiently absorbing the impact.

The airbag device 30 of FIG. 7 includes an airbag 31 for a passenger similar to the above-mentioned airbag device 10.

The airbag 31 is made by sewing a pair of side panels 32 and a front panel 33 together, and a vent hole 34 is formed in each of the side panels. An opening 35 is formed in the rear portion of the airbag 31 to receive gas from an inflator (not shown). Flaps 36, 37, 38 and 39 are disposed around the periphery of the opening 35 to couple the airbag 31 with a container (not shown).

Further, the airbag 31 has a strap 40, one end of which is coupled with the upper portion of one side panel 32, the mid-portion of which extends below the airbag 31, and the other end of which is coupled with the upper portion of the other side panel 32. The strap 40 is formed in a bifurcated-shape similar to the straps 8 and 24 of the above-mentioned embodiments. That is, the strap 40 includes a first small strap 41 and a second small strap 42, each having a predetermined length on one half side thereof, and a tearable portion 43 on the other half portion thereof. The first and second small straps 41 and 42 are formed by being divided in the bifurcated-shape with a slit by cutting the strap 40 from one end thereof. The tearable portion 43 has a sufficient length so that it can be torn from the bifurcated portion of the small straps 41 and 42 so as to increase the length of the strap 40 by pulling them in a direction where they are separated from each other.

An end side of the first small strap 41 of the strap 40 is coupled with the one side panel 32 at a portion near the upper edge thereof. Then, the first small strap 41 extends below the airbag 31 along the one side panel 32, and the bifurcated portion of the small straps 41 and 42 is disposed near the flap 39 below the opening 35. Then, the second small strap 42 extends upward from below the airbag 31 along the other side panel 32, and an end side of the other side panel 32 is coupled with the other side panel 32 near an upper edge thereof. When the internal pressure of the airbag is equal to or less than a predetermined pressure at a time the airbag expands, the strap 40 disposed as described above restricts the expansion of the upper portion of the airbag 31 by pulling downward the portions of the side panels 32 which are located in the vicinity of the upper edges thereof on both sides of the airbag 31. Whereas, when the internal pressure of the airbag exceeds the predetermined pressure, the small straps 41 and 42 are pulled upward at the end sides thereof as well as the bifurcated-portion thereof is pushed and widened by a portion where the lower portion of an opening of the container, which will be described later, is coupled with the flap 39. Then, the tear tension of the tearable portion 43 has at least a predetermined value. Thus, the tearable portion 43 is torn so as to increase the length of the strap 40, whereby the restriction of the airbag 31 is eased.

In the airbag 31, the flaps 36 to 39 disposed around the peripheral edge portion of the opening 35 formed in the rear end of the airbag 31 are coupled with a peripheral edge portion of an opening (not shown) of the airbag accommodation container, respectively, similar to the above-mentioned embodiments. The inflator is disposed in the container, and gas generated from the inflator is introduced into the airbag 31 through these openings. The airbag 31 is accommodated in the container by being folded. The airbag device 30 is constructed by mounting a module cover (not shown) so as to cover the opening of the container. The airbag device 30 is used for the passenger's seat, and installed in an instrument panel of an automobile (not shown). Then, in an emergency, such as collision of an automobile, and the like, the airbag device 30 expands the airbag 31 by causing the inflator to eject gas and deploys the airbag in a compartment.

When the internal pressure of the airbag is equal to or less than the predetermined pressure at the beginning of expansion of the airbag, the strap 40 pulls the upper edges of the side panels 32 on both sides of the airbag 31 downward without tearing the tearable portion 43 and restricts the expansion of the upper portion of the airbag 31. At that time, the airbag 31 has a small apparent volume, which causes the airbag to deploy rapidly as well as the lower portion of the airbag 31, which is not restricted by the strap 40, is largely enlarged at an early time and stops the forward movement of an occupant by receiving the lower portion (waist and stomach) of the upper half of the body of the occupant. Further, when the internal pressure of the airbag exceeds the predetermined pressure, the tear tension of the tearable portion 43 has at least the predetermined value and the tearable portion 43 is torn so as to increase the length of the strap 40 and the restriction of the airbag 31 is eased. Thus, the upper portion of the airbag 31 is enlarged and the internal pressure of the airbag is reduced. As a result, the airbag absorbs an impact by receiving the upper portion (head and chest) of the upper half of the body of the occupant falling down forward.

Note that the airbag device 30 is also arranged such that the strap 40 has a relatively short initial length as well as the tearable portion 43 begins to tear before the occupant plunges to the airbag 31. Accordingly, the internal pressure of the airbag is sufficiently increased before the occupant plunges to the airbag 31 as well as the airbag 31 can reliably and securely begin to absorb the impact at a time the occupant plunges to the airbag 31. Further, since the tearable portion 43 has the sufficient length, the internal pressure of the airbag is prevented from being excessively increased because the tearable portion 43 is continuously torn even after the occupant plunges to the airbag 31. Thus, the airbag device 30 arranged as described above also can protect the occupant by sufficiently absorbing the impact.

Figure 11:
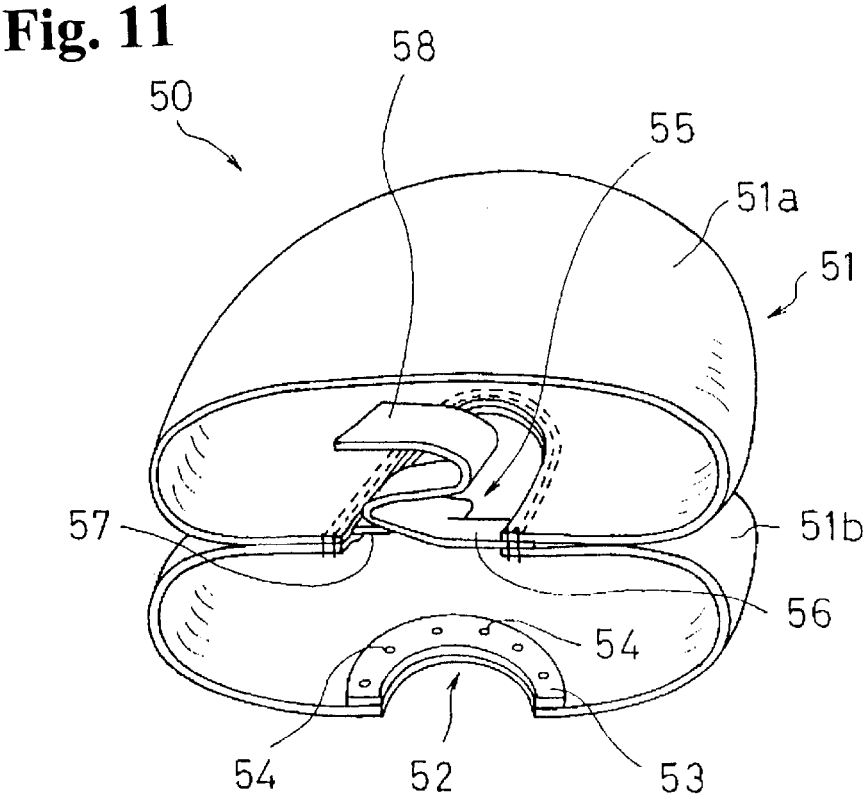
FIG. 11 is a sectional perspective view of an airbag portion of an airbag device according to a fourth embodiment of the present invention when the airbag portion is restricted.
Figure 12:
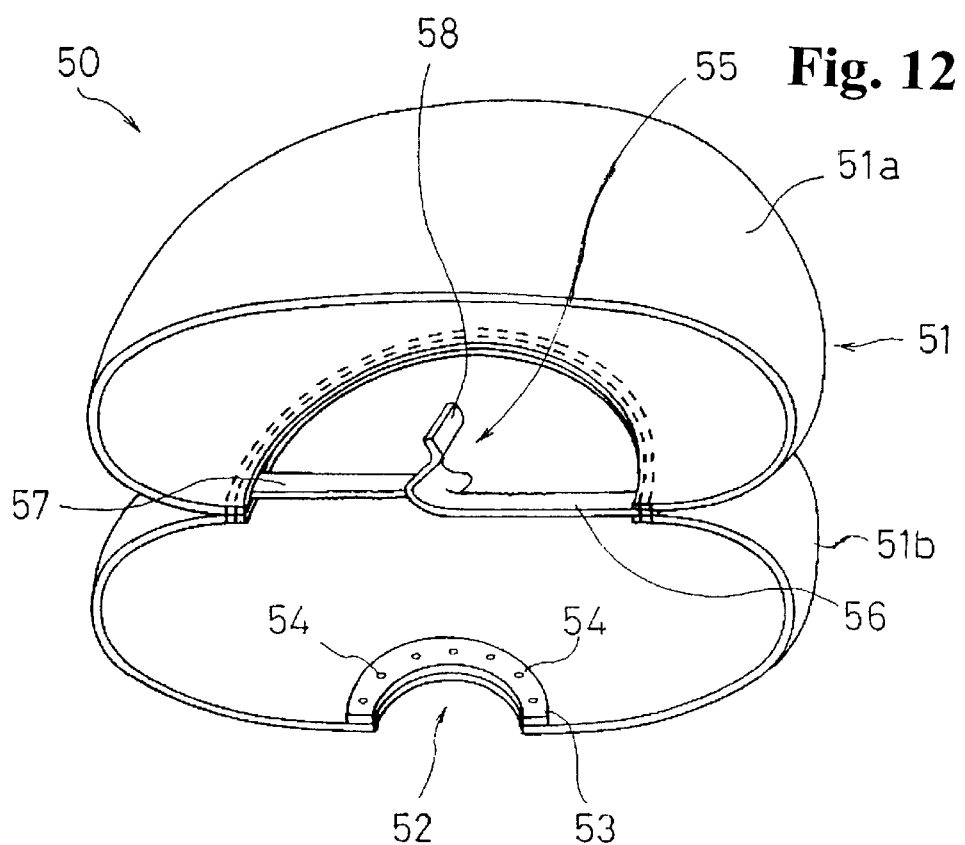
FIG. 12 is a sectional perspective view of the airbag portion of FIG. 11 when the restriction thereof is eased.

While the airbag devices of the above-mentioned embodiments are used as the passenger's seat airbag, the airbag device of the present invention can be applied to various devices for, e.g. a driver's seat, a rear seat, side protection, and the like. Application of the airbag device of the present invention to other devices will be described below with reference to FIGS. 11 and 12. FIG. 11 is a sectional perspective view of an airbag portion showing an embodiment of the airbag device of the present invention which is applied as a driver's seat airbag device, and FIG. 12 is a sectional perspective view showing a mode of the airbag portion after the restriction thereof is eased.

In the embodiment, the airbag device 50 includes a driver's seat airbag 51 for an automobile. The airbag 51 is formed in a bag-shape by sewing the peripheries of a front panel 51a and a rear panel 51b together, each of which is composed of a circular cloth, or the like. When the airbag 51 is installed in the automobile, the front panel 51a faces an occupant, and the rear panel 51b is coupled with a retainer (not shown) of the airbag device on an opposite side of the front panel 51a. The airbag 51 is expanded by gas from an inflator (not shown) provided with the retainer.

An opening 52 for the inflator is formed in the vicinity of a center of the rear panel 51b. A reinforcing cloth 53 is disposed around a peripheral edge portion of the opening 52 of the rear panel 51b to prevent damage of the peripheral edge portion of the opening 52 by a tension when the airbag expands, heat of gas generated from the inflator, and the like. The reinforcing cloth 53 is disposed so as to surround the opening 52 and coupled with the rear panel 51b by coupling means, such as sewing, adhesion, intimate contact, or the like. Further, insert holes 54 are formed around the periphery of the opening 52, each of the insert holes 54 being composed of a small hole passing through the reinforcing cloth 53 and the rear panel 51b, and a bolt or the like being inserted through each of the insert holes 54 to mount the airbag 51 on the retainer.

In the airbag 51, confronting portions of the sides thereof are coupled with each other by a strap 55. The strap 55 is formed in a belt-shape having a sufficient length and arranged similarly to the above-mentioned strap 8 and the like. That is, one half side of the strap 55 is composed of first and second slender straps 56 and 57 each having a predetermined length, and the other half side of the strap 55 is arranged as a tearable portion 58. The first and second straps 56 and 57 are formed by dividing the strap 55 from one end thereof in a bifurcated-shape along a lengthwise direction, and the tearable portion 58 can be torn from the bifurcated portion of the first and second straps 56 and 57 by pulling them in a direction where they are separated from each other. When the internal pressure of the airbag is equal to or less than a predetermined pressure at the beginning of expansion thereof, a deployed-shape of the airbag 51 is restricted by the strap 55 similar to the above-mentioned straps. In contrast, when the internal pressure of the airbag exceeds the predetermined pressure, a tension acting on the strap 55 becomes at least a predetermined value. Thus, the restriction of the deployed-shape of the airbag is released or eased by tearing the tearable portion 58 so as to increase the length of the strap 55.

Note that the strap 55 has a relatively short length when the airbag is restricted as well as the tearable portion 58 begins to tear by an increase of the internal pressure of the airbag before the occupant plunges to the airbag 51 at a time the airbag 51 expands in order to ease the restriction of the airbag 51. With this arrangement, it can be prevented in the airbag 51 that the internal pressure of the airbag is not sufficiently increased before the occupant plunges to the airbag 51 and that the internal pressure of the airbag rapidly changes just after the occupant plunges to the airbag 51.

The airbag 51 is coupled with the retainer of the airbag device 50 by the bolts or the like through the peripheral edge portion of the opening 52. The inflator is provided with the retainer. When the airbag 51 is to be coupled with the retainer, the end of the inflator is introduced into the interior of the airbag 51 from the opening 52. Then, the airbag 51 is folded and covered with a module cover (not shown), whereby the airbag device 53 is constructed. Further, although not shown, the airbag device 50 is installed on a steering wheel or the like of the automobile. In an emergency, such as collision of an automobile, and the like, the airbag device 50 expands the airbag 51 by causing the inflator to eject gas, so that the airbag 51 deploys in a compartment by pushing and opening the module cover.

In the airbag device 50 arranged as described above, when the airbag 51 expands in an emergency, it is expanded rapidly acting as an airbag having a small apparent volume with a side peripheral portion thereof narrowed as shown in FIG. 11 in case the internal pressure of the airbag is equal to or less than the predetermined pressure at the beginning of expansion because the expansion of the sides is restricted by the strap 55. Then, when the internal pressure of the airbag exceeds the predetermined pressure, the tension acting on the strap 55 has at least the predetermined value, and the tearable portion 58 is torn so as to increase the length of the strap 55 in order to ease the restriction of the airbag 51. As a result, the sides of the airbag 51 can be enlarged as shown in FIG. 12, and the internal pressure of the airbag 51 is reduced by an increase of the volume thereof, whereby the impact of the occupant who plunges to the airbag 51 can be absorbed.

As described above, since the airbag 51 deploys as an airbag having a relatively small volume with the sides thereof narrowed at the beginning of expansion even in the driver's seat airbag device 50, the airbag can be expanded rapidly even if the inflator has a small output. Further, the strap 55 has a short length when it restricts the airbag as well as the restriction thereof is eased by that the tearable portion 58 begins to tear before the occupant plunges to the airbag 51. Thus, the airbag 51 can begin to absorb an impact reliably and smoothly simultaneously with plunge of the occupant to the airbag 51. Further, the internal pressure of the airbag is prevented from being excessively increased because the tearable portion 55 is continuously torn even after the occupant plunges to the airbag 51. Thus, the airbag device 50 arranged as described above also can protect the occupant by sufficiently absorbing the impact.

Figure 13:
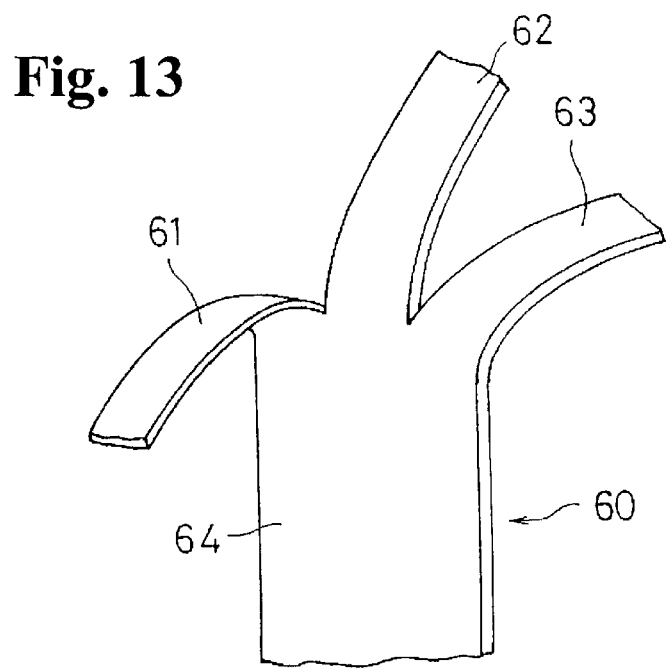
FIG. 13 is a view explaining a modification of the strap of the airbag device of the present invention.
Figure 14:
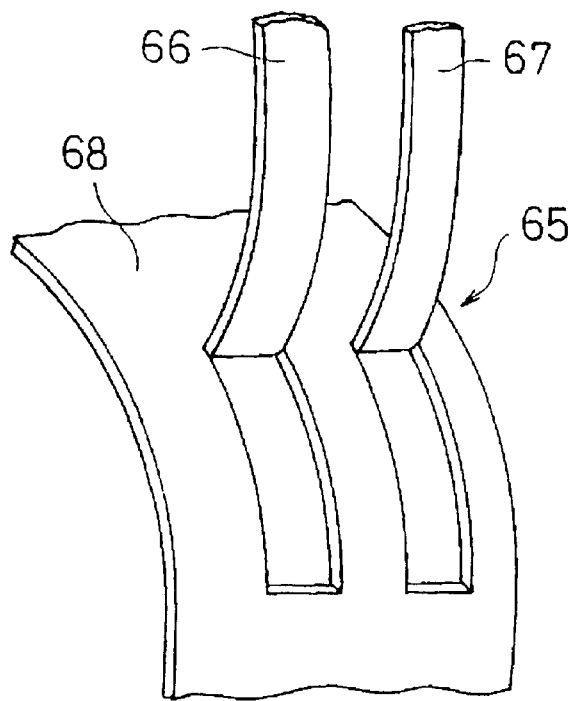
FIG. 14 is a view explaining a modification of the strap of the airbag device of the present invention.
Figure 15:
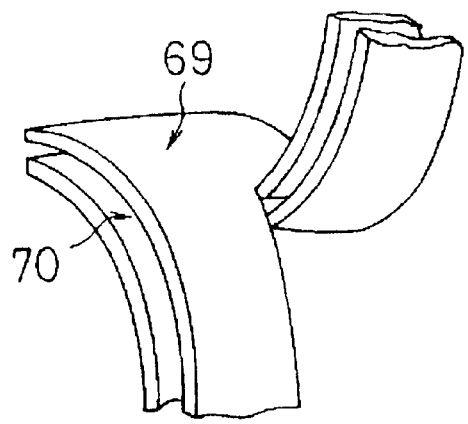
FIG. 15 is a view explaining a modification of the strap of the airbag device of the present invention.

In the above embodiment, the strap has the first and second slender straps 56 and 57, each having the predetermined length on the one half side thereof, and the other half side thereof is arranged as the tearable portion. The first and second straps are formed by dividing the strap from the one end thereof in the bifurcated-shape along the lengthwise direction, and the tearable portion has the sufficient length, so that it can be torn along the lengthwise direction from the bifurcated portion of the first and second straps by pulling them in the direction where they are separated from each other. However, the arrangement of the strap is not limited thereto and the number of straps provided with the airbag also is not limited thereto. For example, the strap may be arranged as shown in FIGS. 13 to 15. FIGS. 13 to 15 are perspective views showing main portions of modifications of the strap.

In FIG. 13, one half side of a strap 60 is formed in a trifurcated-shape in which an extreme end of the strap 60 is divided into three small slender straps 61 to 63, and the other half side thereof is arranged as a tearable portion 64 having a sufficient length so that it can be torn from the trifurcated-portions of the respective straps 61 to 63 by pulling them in a direction where they are separated from one another with a predetermined tension. In the strap 60, end sides of the small straps 61 to 63 are coupled with respective portions of an airbag.

The strap 60 can be used to restrict a deployed-shape of the airbag by coupling a plurality of portions of the airbag with each other. The number of the small slender straps formed on the one half side of the strap is not limited to two or three described above and may be set to four or more.

In FIG. 14, a strap 65 includes two small slender tongue-shaped straps 66 and 67 which are formed by cutting and raising the strap 65 from a mid-portion on one half side thereof. Each of the small straps 66 and 67 is formed by making a pair of slits, which extends in a lengthwise direction of the strap 65, at a mid-portion of the strap 65 at the one half side thereof, by cutting the ends of the adjacent slits on the ends on the one half side thereof to couple together, and by raising a region surrounded by these slits of the strap 65 in a tongue-shape. In the strap 65, the ends of the small tongue-shaped straps 66 and 67 and the end of the strap 65 on the one half side thereof are pulled in a direction where they are separated from each other, and the respective ends are coupled with portions of an airbag. Note that the other half side of the strap 65 is arranged as a tearable portion 68 which can be torn along the lengthwise direction from both corners of the base end portions of the respective small straps 66 and 67 by pulling the small straps 66 and 67 and the end of the strap 65 on the one half side in the direction where they are separated from each other.

In the strap 65, two tear start ends are disposed at both end portions of the respective small straps, and the strap 65 has the two small straps arranged as described above. Thus, the strap 65 has a tear strength which is four times as large as that of the respective straps described above. That is, in the above arrangement, a tear strength of the strap can be easily increased.

Further, in the strap of the present invention, two or more straps may be overlapped as straps 69 and 70 shown in FIG. 15. The above arrangement also can increase the tear strength of the strap as well.

Next, another embodiment of the present invention will be described below with reference to FIGS. 16 and 17.

Figure 16:
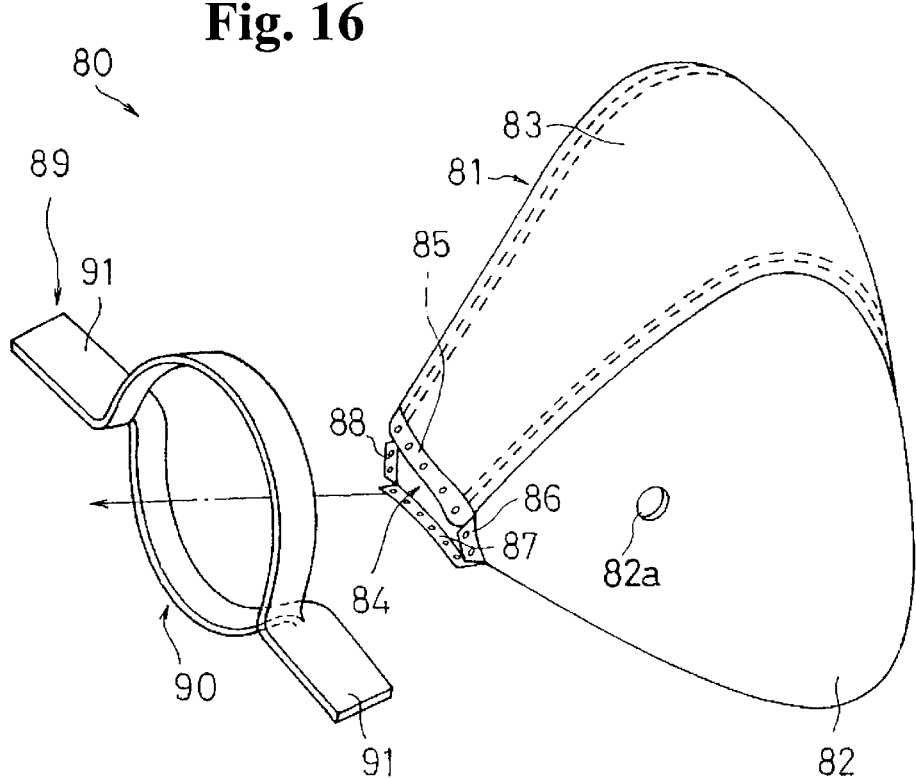
FIG. 16 is an exploded perspective view showing an arrangement of an airbag portion of an airbag device according to a fifth embodiment of the present invention.
Figure 17:
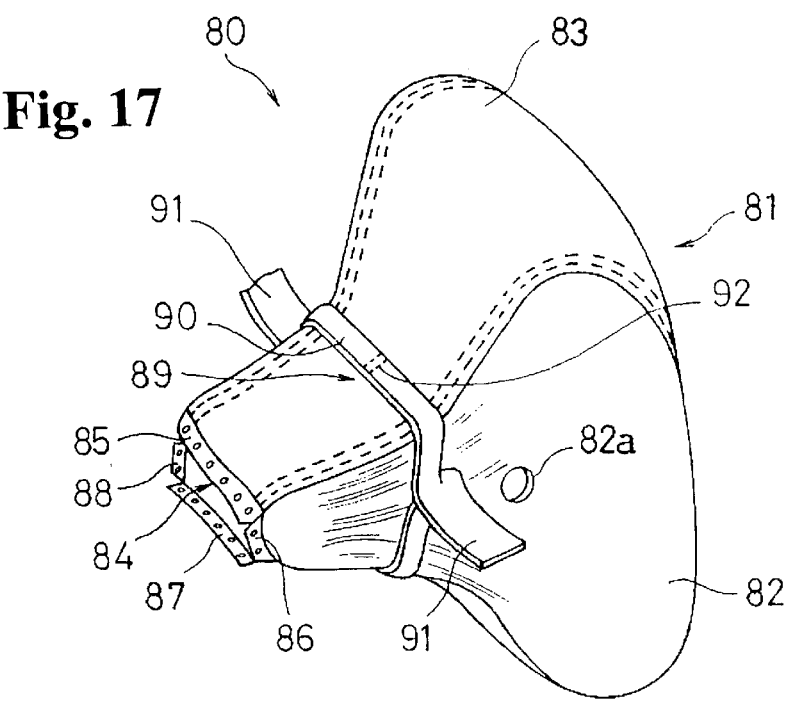
FIG. 17 is a perspective view of the airbag portion of the airbag device according to the embodiment of FIG. 16 when the airbag portion is restricted.

FIG. 16 is an exploded perspective view of an airbag portion of a passenger's seat airbag device according to another embodiment of the present invention, and FIG. 17 is a perspective view showing a mode of the airbag portion when it is restricted.

In the embodiment, the airbag device 80 includes a passenger's seat airbag 81. The airbag 81 is made by sewing a pair of side panels 82 and a front panel 83 together, and a vent hole 82a is formed in each of the side panels 82. An opening 84 is formed in the rear portion of the airbag 81 to receive gas from an inflator (not shown). Flaps 85, 86, 87 and 88 are disposed around the periphery of the opening 84 to couple the airbag 81 with a container (not shown).

A strap 89 is disposed to the airbag 81 so as to surround a side peripheral surface of the airbag 81 on a rear end thereof. The strap 89 has a sufficient length similar to the above-mentioned embodiments and is composed of a base cloth composed of a cloth, resin, or the like which can be torn only in a lengthwise direction thereof. A loop-shaped portion 90, through which the rear portion of the airbag 81 is inserted, is formed at a center of the strap 89. The loop-shaped portion 90 is composed of a slit, which is formed in the vicinity of a center of the base cloth along a lengthwise direction thereof and has a predetermined length, and the rear end of the airbag 81 is inserted into the slit so as to push and widen it. Both end sides of the loop-shaped portion 90 of the strap 89 are arranged as tearable portions 91 which can be torn to more increase the loop-shaped portion 90 along the lengthwise direction of the strap 89 from both sides of the slit when the loop-shaped portion 90 is pushed and widened with a force equal to or larger than a predetermined value.

In the strap 89, after a rear end side of the airbag 81 is inserted into the loop-shaped portion 90, the mid-portions of the loop-shaped portion 90 are coupled with the front panel 83 of the airbag 81 at the predetermined positions thereof by coupling means, such as a sewing thread 71, an adhesive, or the like. Further, in the strap 89, when the internal pressure of the airbag is equal to or less than a predetermined pressure at a time the airbag expands, the tearable portions 91 are not torn as well as expansion of the rear end side of the airbag 81 is restricted by the loop-shaped portion 90. Whereas, when the internal pressure of the airbag exceeds the predetermined pressure, the tear tensions of the tearable portions 91 become at least a predetermined value, so that the tearable portions 91 are torn so as to increase the loop-shaped portion 90, whereby the restriction of the airbag 81 is eased. With this arrangement, when the internal pressure of the airbag is equal to or less than the predetermined pressure at the time the airbag expands, the expansion of the portion of the airbag 81, which is surrounded by the loop-shaped portion 90, on the rear end side thereof is restricted and the airbag deploys in a shape in which the rear end side thereof is narrowed as shown in FIG. 17. Then, when the internal pressure of the airbag exceeds the predetermined pressure, the airbag 81 tears the tearable portions 91 by pushing and widening the loop-shaped portion 90 with a force having at least the predetermined value, which eases the airbag 81 restricted by the strap 89, so that the rear end of the airbag 81 is more expanded.

In the airbag 81, the flaps 85 to 88 disposed around the peripheral edge portion of the opening 84 at the rear end of the airbag 81 are coupled with a peripheral edge portion of an opening (not shown) of an airbag accommodation container, respectively, similar to the passenger's seat airbags of the above-mentioned embodiments. The inflator is disposed in the container and gas generated from the inflator is introduced into the airbag 81 through these openings. The airbag 81 is accommodated in the container by being folded. The airbag device 80 is constructed by mounting a module cover (not shown) so as to cover the opening of the container. The airbag device 80 is applied as the passenger's airbag device and installed in an instrument panel of an automobile (not shown). Then, in an emergency, such as collision of an automobile, and the like, the airbag device 80 expands the airbag by causing the inflator to eject gas and deploys the airbag 81 in a compartment.

When the internal pressure of the airbag is equal to or less than the predetermined pressure at the beginning of expansion thereof, the tearable portions 91 are not torn and the strap 89 restricts the expansion of the rear end side of the airbag 81. At that time, the airbag 81 has a small apparent volume with the narrowed rear end side, which causes the airbag to deploy rapidly as well as a portion of a front surface side of the airbag 81, which is not restricted by the strap 89, is largely expanded at an early time and stops the forward movement of an occupant by receiving the upper half of the body of the occupant. Further, when the internal pressure of the airbag exceeds the predetermined pressure, the tear tensions of the tearable portions 91 reach at least the predetermined value and the tearable portions 91 are torn, so that the loop-shaped portion 90 is increased, and the restriction of the airbag 81 is eased. Thus, the rear end side of the airbag 81 is more expanded. As a result, the airbag absorbs an impact by receiving the occupant falling down forward without an excessive increase of the internal pressure of the airbag.

Note that the airbag device 80 is also arranged such that the loop-shaped portion 90 of the strap 89 has a relatively short initial length as well as the tearable portions 91 begin to tear by the increase of the internal pressure of the airbag before the occupant plunges to the airbag 81 and thereafter it is continuously torn. Accordingly, the internal pressure of the airbag is sufficiently increased before the occupant plunges to the airbag 81 as well as the airbag 81 can reliably and securely absorb the impact at the time the occupant plunges to the airbag 81. Further, since the tearable portions 91 have the sufficient lengths, the internal pressure of the airbag is prevented from being excessively increased because the tearable portions 91 are continuously torn even after the occupant plunges to the airbag 81. Thus, the airbag device 80 arranged as described above also can protect the occupant by sufficiently absorb the impact. Then, in the airbag device 80, it is possible for the front surface side of the airbag 81 to substantially perfectly deploy rapidly even if the deployment thereof is restricted by the strap 89, which permits the airbag 81 to protect the occupant by receiving the entire upper half of the body of the occupant at an early time.

In the embodiment, while the airbag device 80 is applied as the passenger's seat airbag device, the airbag device having the strap including the loop-shaped portion also can be applied as other airbag device, for example, a driver's seat airbag device. A driver's seat airbag device having a strap including such a loop-shaped portion will be explained below with reference to FIGS. 18 and 19.

Figure 18:
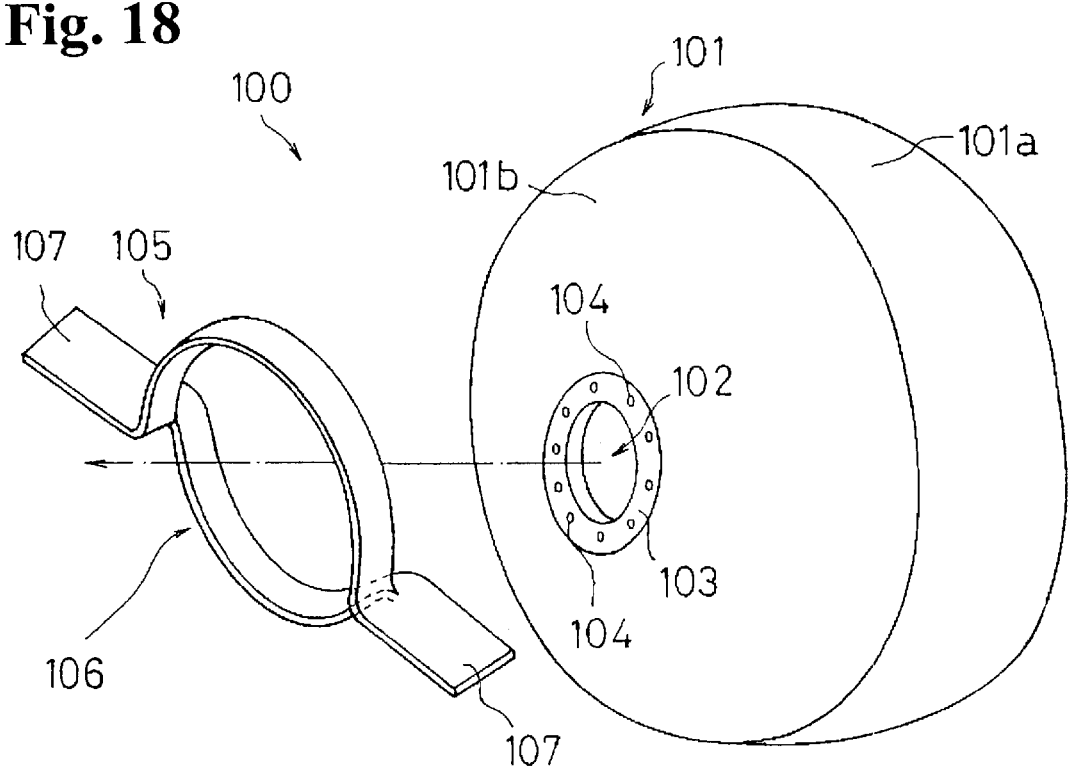
FIG. 18 is an exploded perspective view showing an arrangement of an airbag portion of an airbag device according to a sixth embodiment of the present invention.
Figure 19:
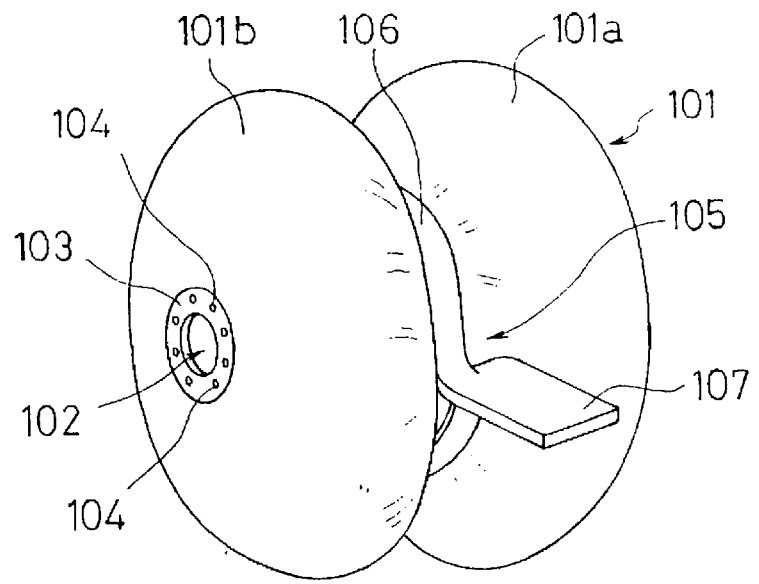
FIG. 19 is a perspective view of the airbag portion of the airbag device according to the embodiment of FIG. 18 when the airbag portion is restricted.

FIG. 18 is an exploded perspective view of an airbag portion of a driver's seat airbag device according to a further embodiment of the present invention, and FIG. 19 is a perspective view showing a mode of the airbag portion when it is restricted.

In the embodiment, the airbag device 100 includes a driver's seat airbag 101 for an automobile. The airbag 101 is formed in a bag shape by sewing together the peripheries of a front panel 101a and a rear panel 101b, each composed of a circular cloth or the like. When the airbag 101 is installed in the automobile, the front panel lola faces an occupant, and the rear panel 101b is coupled with a retainer (not shown) of the airbag device on an opposite side of the front panel 51a. The airbag 101 is expanded by gas from an inflator (not shown) provided at the retainer.

An opening 102 for the inflator is formed in the vicinity of a center of the rear panel 101b. A reinforcing cloth 103 is disposed around a peripheral edge portion of the opening 102 of the rear panel 101b to prevent damage of the peripheral edge portion of the opening 102 by a tension when the airbag expands, heat of gas generated from the inflator, and the like. The reinforcing cloth 103 is disposed so as to surround the opening 102 and coupled with the rear panel 101b by coupling means, such as sewing, adhesion, intimate contact, or the like. Further, insert holes 104 are formed around the peripheral edge portion of the opening 102, each of the insert holes 104 being composed of a small hole passing through the reinforcing cloth 103 and the rear panel 101b, and a bolt or the like being inserted through each of the insert holes 104 to mount the airbag 101 on the retainer.

A strap 105 is disposed to the airbag 101 so as to surround a side portion thereof. The strap 105 has a sufficient length similar to the above-mentioned embodiments and is composed of a base cloth composed of a cloth, resin, or the like which can be torn only in a lengthwise direction thereof. A loop-shaped portion 106, through which one half side of the airbag 101 is inserted, is formed at a center of the strap 105. The loop-shaped portion 106 is composed of a slit which is disposed in the vicinity of a center of the base cloth along a lengthwise direction thereof and has a predetermined length, and the one half side of the airbag 101 is inserted into the loop-shaped portion 106 so as to push and widen the slit. Both sides of the loop-shaped portion 106 of the strap 105 are arranged as tearable portions 107 which can be torn to more increase the loop-shaped portion 106 along the lengthwise direction of the strap 105 from both sides of the slit when the loop-shaped portion 106 is pushed and widened with a force equal to or larger than a predetermined value.

After the one half side of the airbag 101 is inserted into the loop-shaped portion 106, the strap 105 is disposed so as to surround a side portion of the airbag 101 and mid-portions of the loop-shaped portion 106 are coupled with the airbag 101 at predetermined positions thereof by coupling means, such as a sewing thread, an adhesive, or the like. Further, in the strap 105, when the internal pressure of the airbag is equal to or less than a predetermined pressure at a time the airbag expands, the tearable portions 107 are not torn as well as the loop-shaped portion 106 restricts expansion of the side portion of the airbag 101. Whereas, when the internal pressure of the airbag exceeds the predetermined pressure, the tear tensions of the tearable portions 107 become at least a predetermined value, so that the tearable portions 107 are torn so as to increase the loop-shaped portion 106, whereby the restriction of the airbag 101 is eased. With this arrangement, when the internal pressure of the airbag is equal to or less than the predetermined pressure at the time the airbag expands, expansion of the side portion, which is surrounded by the loop-shaped portion 106, of the airbag 101 is restricted and the airbag deploys in a shape in which the side portion thereof is narrowed as shown in FIG. 19. Then, when the internal pressure of the airbag exceeds the predetermined pressure, the airbag 101 tears the tearable portions 107 by pushing and widening the loop-shaped portion 106 with a force having at least the predetermined value, which eases the airbag 101 restricted by the strap 105 to thereby more expand the side portion of the airbag 101 to the outside.

The airbag 101 is coupled with the retainer of the airbag device 100 by bolts or the like through the peripheral edge portion of the opening 102. The inflator is mounted on the retainer. When the airbag 101 is to be coupled with the retainer, the end of the inflator is introduced into the interior of the airbag 101 from the opening 102. Then, the airbag 101 is folded and covered with a module cover (not shown), whereby the airbag device 100 is constructed. Further, although not shown, the airbag 100 is installed on a steering wheel or the like of the automobile. In an emergency, such as collision of an automobile, and the like, the airbag device 100 expands the airbag 101 by causing the inflator to eject gas as well as the airbag 101 deploys in a compartment by pushing and opening the module cover.

In the airbag device 100 arranged as described above, when the airbag 101 expands in the emergency, it is expanded rapidly acting as an airbag having a small apparent volume with a side peripheral portion thereof restricted as shown in FIG. 19 in case the internal pressure of the airbag is equal to or less than the predetermined pressure at the beginning of expansion because expansion of the side portion thereof is restricted by the strap 105. Then, when the internal pressure of the airbag exceeds the predetermined pressure, the tension acting on the strap 105 has at least the predetermined value, and the tearable portions 107 are torn so as to increase the length of the strap 106 in order to ease the restriction of the airbag 101. As a result, the side portion of the airbag 101 can be enlarged and the internal pressure of the airbag 101 is reduced by an increase of the volume thereof, whereby the impact of the occupant who plunges to the airbag 101 can be absorbed.

The airbag device 100 is also arranged such that the loop-shaped portion 106 of the strap 105 has a relatively short initial length as well as the tearable portions 107 begin to tear by the increase of the internal pressure of the airbag before the occupant plunges to the airbag 101 and thereafter it is continuously torn. Accordingly, the internal pressure of the airbag is sufficiently increased before the occupant plunges to the airbag 101 as well as the airbag 101 can reliably and securely begin to absorb the impact at a time the occupant plunges to the airbag 101. Further, since the tearable portions 107 have the sufficient lengths, the internal pressure of the airbag is prevented from being excessively increased because the tearable portions 107 are continuously torn even after the occupant plunges to the airbag 101. Thus, the airbag device 100 arranged as described above also can protect the occupant by sufficiently absorbing the impact.

Note that, in the embodiment, while the strap 105 is disposed so as to surround the side portion of the airbag 101 on the outer peripheral surface thereof, the position of the strap 105 is not limited thereto. For example, the strap 105 may be disposed in the interior of the airbag, and the loop-shaped portion 106 may be attached on the side portion of the airbag 101 along the inner peripheral surface of the airbag.

Figure 20:
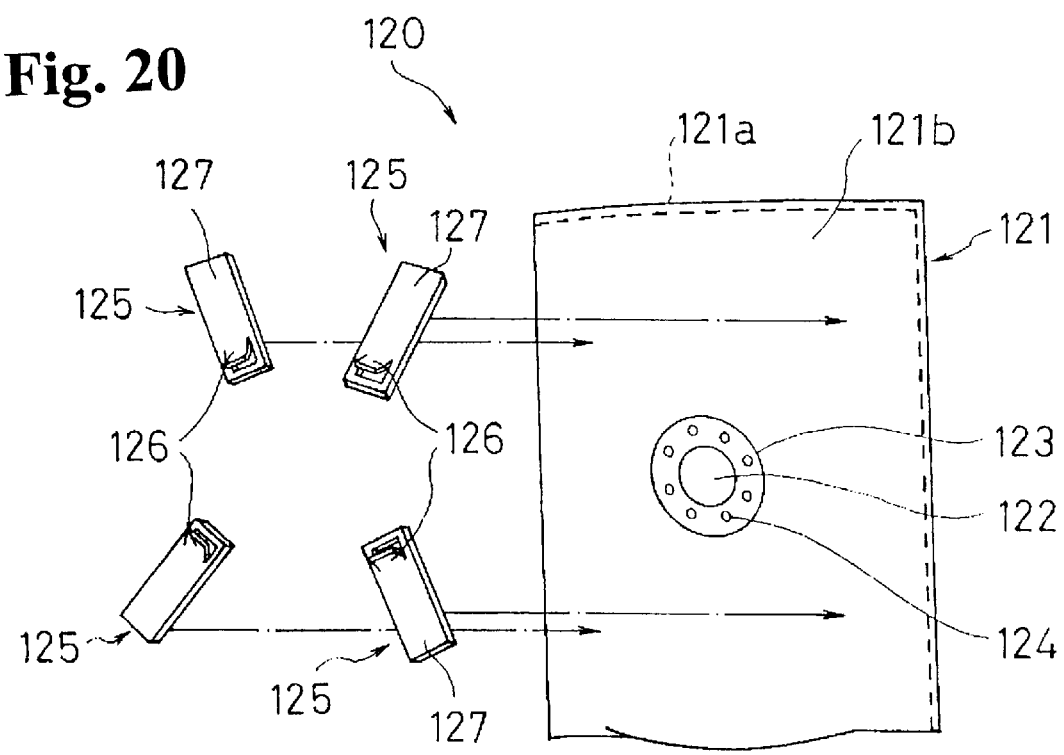
FIG. 20 is an exploded perspective view showing an arrangement of an airbag portion of an airbag device according to a seventh embodiment of the present invention.
Figure 21:
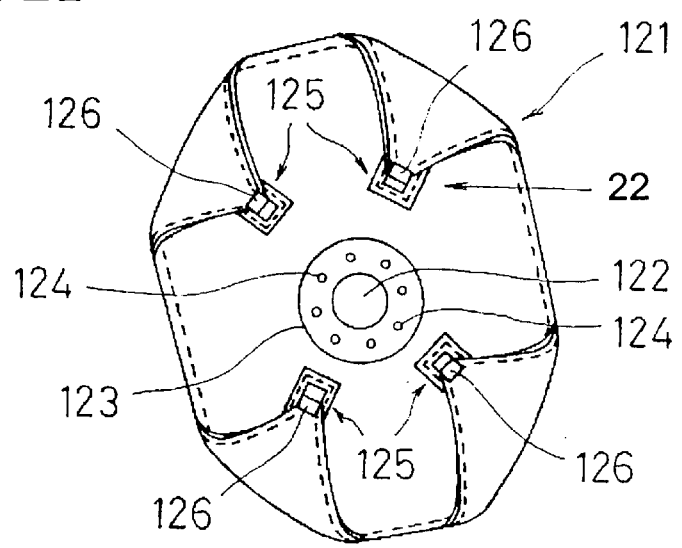
FIG. 21 is a perspective view of the airbag portion of the airbag device according to the embodiment of FIG. 20 when the airbag portion is restricted.
Figure 22:
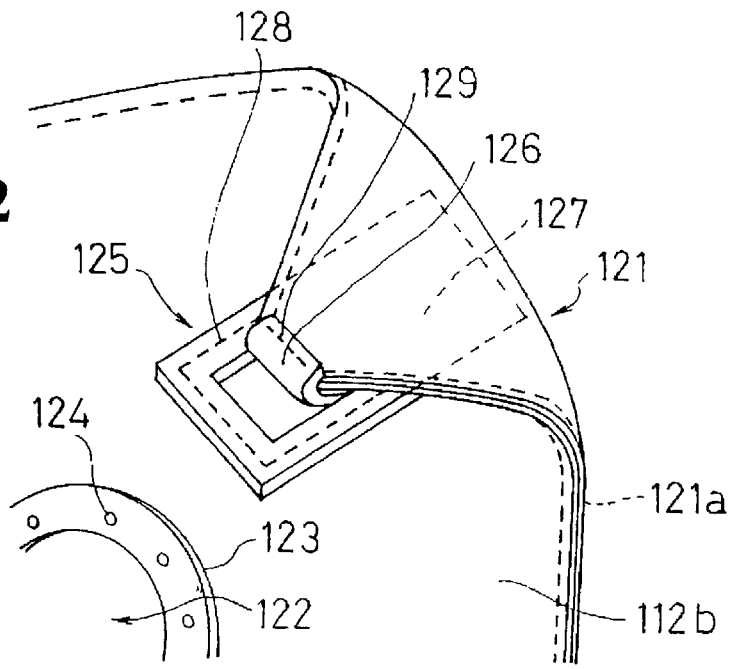
FIG. 22 is an enlarged view of a portion 22 of FIG. 21.

A still further embodiment of the present invention will be described below with reference to FIGS. 20 to 22, wherein FIG. 20 is an exploded perspective view showing an arrangement of an airbag portion of an airbag device according to the still further embodiment of the present invention;

FIG. 21 is a perspective view of the airbag portion of the airbag device; and FIG. 22 is an enlarged view of a portion 22 in FIG. 21, which is a perspective view of the airbag portion when the restriction thereof is eased.

In the embodiment, the airbag device 120 includes a driver's seat airbag 121 for an automobile. The airbag 121 is formed in a bag-shape by sewing together peripheral edge portions of a front panel 121a and a rear panel 101b, each being composed of an approximately rectangular cloth or the like. When the airbag 121 is installed in the automobile, the front panel 121a faces an occupant, and the rear panel 101b is coupled with a retainer (not shown) of the airbag device on an opposite side of the front panel 21a. The airbag 121 is expanded by gas from an inflator (not shown) provided with the retainer.

An opening 122 for the inflator is formed in the vicinity of a center of the rear panel 101b. A reinforcing cloth 123 is disposed around a peripheral edge portion of the opening 122 of the rear panel 121b to prevent damage of the peripheral edge portion of the opening 122 by a tension when the airbag expands, heat of gas generated from the inflator, and the like. The reinforcing cloth 123 is disposed so as to surround the opening 122 and coupled with the rear panel 21b by coupling means, such as sewing, adhesion, intimate contact, or the like. Further, insert holes 124 are formed around the peripheral edge portion of the opening 122, each of insert holes 124 being composed of a small hole passing through the reinforcing cloth 123 and the rear panel 121b, and a bolt or the like being inserted through each of the insert holes 124 to mount the airbag 121 on the retainer.

The airbag 121 has straps 125 disposed in the vicinities of the corners of the rear panel 21b thereof, respectively. Each of the straps 125 is composed of a belt-shaped base cloth similar to the straps of the above-mentioned embodiments and has a small strap 126 which is raised from the midportion of the strap 125 on one half side thereof in a tongue-shape. The small strap 126 is formed by raising a region so as to have the tongue-shape, the region being formed in such a manner that it is surrounded by a series of approximately channel-shaped slits which are composed of a pair of cut-shaped slits, which extend along a lengthwise direction of the strap 125 in the vicinity of the end of the strap 125 on the one half side thereof and has a predetermined length, and a cut-shaped slit, which extends in a width direction of the strap 125 so as to connect the ends of the above slits on the one half side thereof. Further, the other half side of each strap 125 is arranged as a tearable portion 127 having a sufficient length so that it can be torn along a lengthwise direction thereof from both corners of the base end portion of the small strap 126 when the end of the small strap 126 is pulled with a predetermined force toward the end of the other half side of the small strap 126.

The straps 125 are attached on the outer surface of the approximately-rectangular-shaped rear panel 21b in the vicinities of the respective corners thereof so as to extend along the diagonal lines of the rear panel 21b. At that time, the straps 125 are disposed so that ends thereof on the sides where the small straps 126 are provided face the opening 122 and that the ends thereof located on the tearable portions 127 side face the respective corner sides of the rear panel 21b. The straps 125 are coupled with the rear panel 21b by coupling means such as sewing, welding, or the like in the regions where the tear of the tearable portions 127 is not obstructed when the small straps 126 are pulled with a force having at least a predetermined value, for example, in outer edges of the straps 125.

The respective corners of the airbag 121 are folded back to the rear panel 21b side. The respective corners of the folded-back airbag 121 are overlapped with the straps 125 which face them, respectively, and the ends of the respective corners are coupled with the ends of the small straps 126 of the straps 125 which face the respective corners by coupling means, such as a sewing thread 129, adhesion, welding or the like.

As described above, the respective corners are folded back to the rear panel 21b side and coupled therewith through the straps 125. Accordingly, when the internal pressure of the airbag is equal to or less than a predetermined pressure when it expands, deployment of the airbag is restricted because the respective corners are kept in a state that they are folded back to the rear panel 21b side by the straps 125. Whereas, when the internal pressure of the airbag exceeds the predetermined pressure, the respective corners of the airbag 121 tear at the tearable portions 127 by pulling the ends of the small straps 126 with a tension having at least a predetermined value. With this operation, since the lengths of the small straps 126 are increased, the airbag 121 restricted by the straps 125 is eased and the respective folded-back corners can deploy, whereby the airbag 121 can be more largely expanded.

The airbag 121 is coupled with the retainer by bolts or the like through the peripheral edge portion of the opening 122. The inflator is mounted on the retainer. When the airbag 121 is to be coupled with the retainer, the end of the inflator is introduced into the interior of the airbag 121 from the opening 122. Then, the airbag 121 is folded and covered with a module cover (not shown), whereby the airbag device 120 is constructed. Further, although not shown, the airbag device 120 is installed on a steering wheel or the like of the automobile. In an emergency, such as collision of an automobile, and the like, the airbag device 120 expands the airbag 121 by causing the inflator to eject gas as well as the airbag 121 deploys in a compartment by pushing and opening the module cover.

In the airbag device 120 arranged as described above, when the airbag 121 expands in the emergency, it is expanded rapidly acting as an airbag having a small apparent volume because the respective corners are restricted by the straps 125 in the folded-state when the internal pressure of the airbag is equal to or less than the predetermined pressure at the beginning of the expansion. Then, when the internal pressure of the airbag exceeds the predetermined pressure, the tension acting on the small straps 126 of the straps 125 has at least the predetermined value, and the tearable portions 127 are torn so as to increase the lengths of the small straps 126 in order to ease the restriction of the airbag 121. As a result, the respective corners can deploy and the internal pressure of the airbag 121 is reduced by an increase of the volume thereof, whereby the impact of the occupant who plunges to the airbag 101 can be absorbed.

Note that the airbag device 120 is also arranged such that each of the straps 125 has a relatively short initial length as well as the tearable portions 127 begin to tear before the occupant plunges to the airbag 120. Accordingly, the internal pressure of the airbag is sufficiently increased before the occupant plunges to the airbag 120 as well as the airbag 120 can reliably and smoothly begin to absorb the impact at a time the occupant plunges to the airbag 120. Further, since the tearable portions 127 have the sufficient lengths, the internal pressure of the airbag is prevented from being excessively increased because the tearable portions 127 are continuously torn even after the occupant plunges to the airbag 120. Thus, the airbag device 120 arranged as described above also can protect the occupant by sufficiently absorb the impact.

Figure 23:
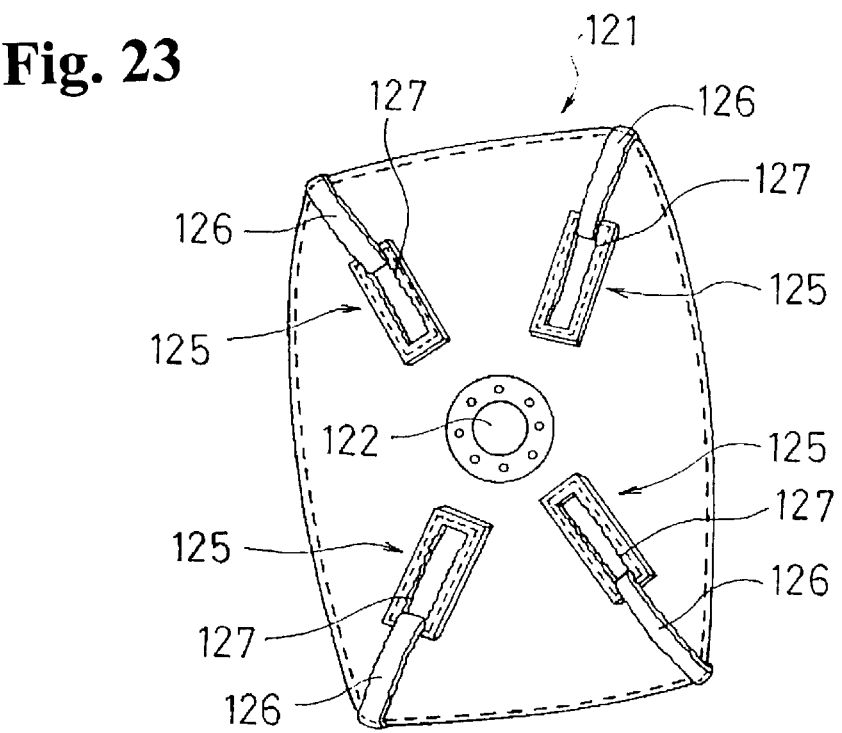
FIG. 23 is a perspective view of the airbag portion of FIG. 20 when the restriction thereof is eased.

In the embodiment, vent holes may be further formed in the airbag, in addition to the above arrangement, so that an impact absorbing effect of the airbag can be achieved also by discharging gas in the airbag through the vent holes. Then, an arrangement shown in, for example, FIG. 23 is exemplified as a method of forming the vent hole.

Figure 24:
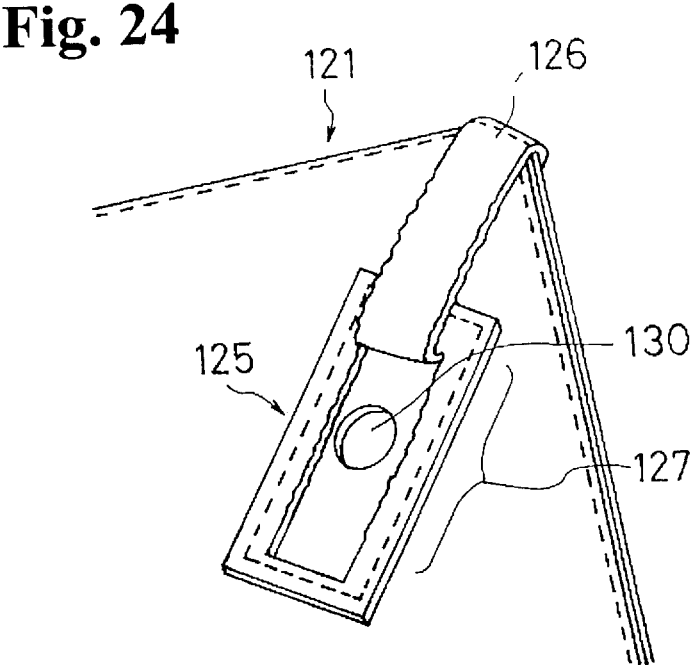
FIG. 24 is a view explaining a modification of the airbag device of FIG. 20.

FIG. 24 is an enlarged view of a strap portion of the airbag of FIG. 22 showing an example of an arrangement of the vent hole. As shown in FIG. 24, in the airbag 121, vent holes 130, each being composed of a circular opening to communicate the outside of the airbag with the inside thereof, are formed to the portions where the tearable portions 127 of the straps 125 overlap with the airbag 121. When the internal pressure of the airbag is equal to or less than the predetermined pressure at a time it expands, the vent holes 130 are covered with the tearable portions 127 of the straps 125, whereas when the internal pressure of the airbag exceeds the predetermined pressure, the vent holes 130 are exposed to the outside because the tearable portions 127 of the straps 125 are torn and the small straps 126 are separated from the vent holes 130.

In the airbag 121 having the vent holes 130 arranged as described above, when the internal pressure of the airbag is equal to or less than the predetermined pressure at the time the airbag expands, gas is not discharged from the vent holes 130 in a large amount and the airbag 121 is rapidly expanded because the vent holes 130 are covered with the tearable portions 127 of the straps 125. Then, when the internal pressure of the airbag exceeds the predetermined pressure, the small straps 126 of the straps 125 are pulled by the corners of the airbag 121 with a tension equal to or more than the predetermined value and tear the tearable portions 127, whereby the vent holes 130 are exposed and the airbag 121 discharges gas through the vent holes 130. With this operation, even if the occupant plunges to the airbag device 120 when the airbag expands, an excessive increase of the internal pressure of the airbag can be reliably prevented and the impact absorbing effect can be more increased.

Note that while the airbag device 120 is applied as the driver's seat airbag device in this embodiment, the airbag device of this embodiment is not limited thereto and may be applied to other airbag. Further, an arrangement of the straps is not limited to the above arrangement, and straps arranged differently may be combined with the above straps.

Figure 25:
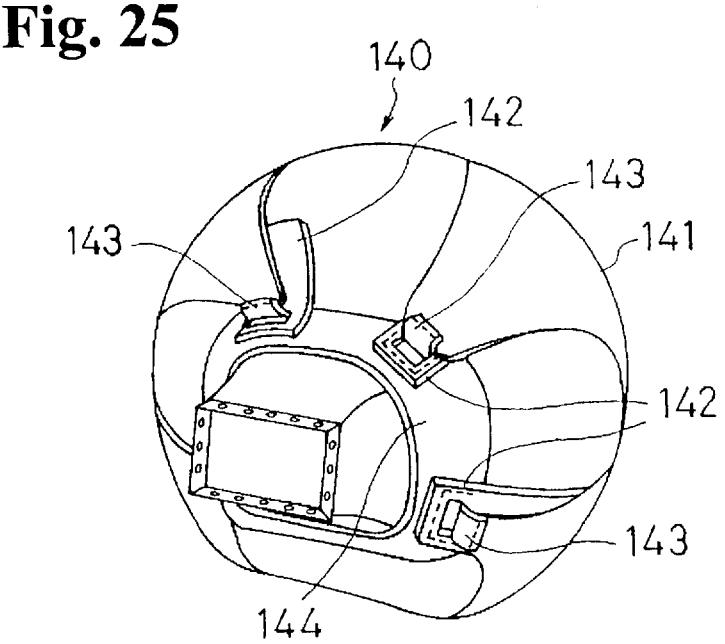
FIG. 25 is a perspective view of an airbag portion of an airbag device according to an eighth embodiment of the present invention when the airbag portion is restricted.
Figure 26:
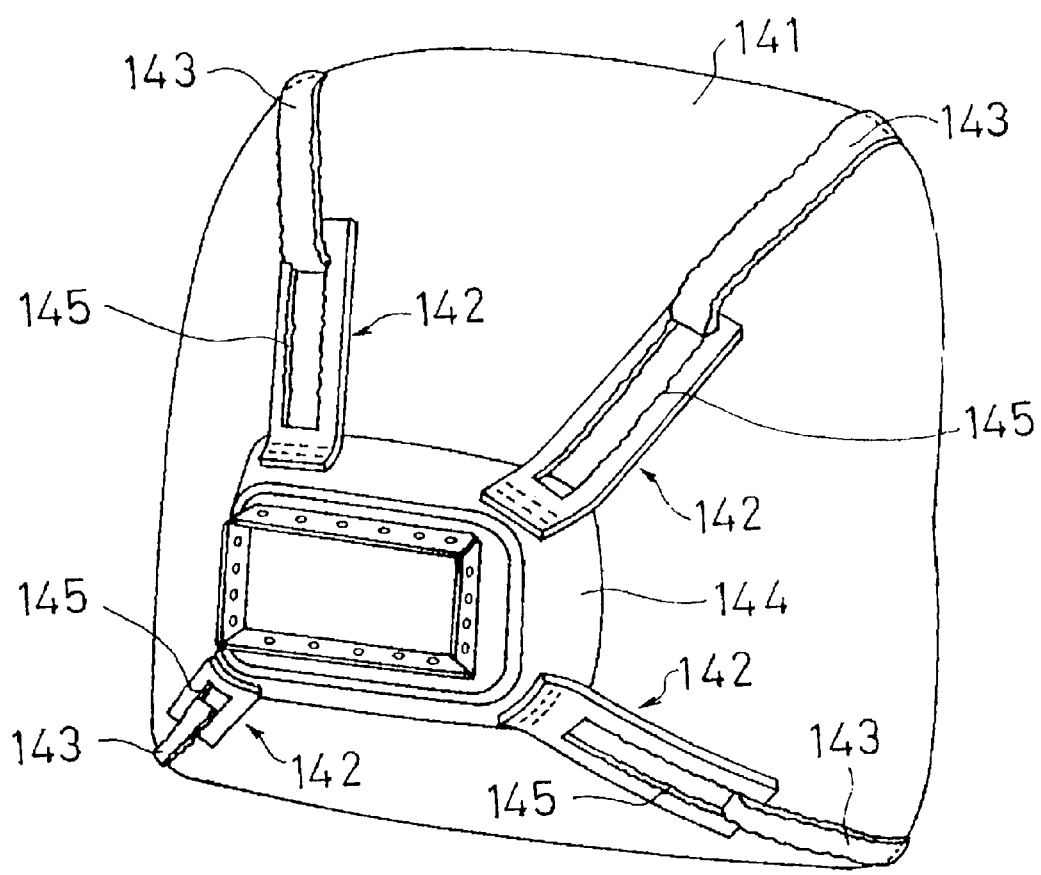
FIG. 26 is a perspective view of the airbag portion of FIG. 25 when the restriction thereof is eased.

For example, an airbag device 140 shown in FIGS. 25 and 26 includes an passenger's seat airbag 141. The ends of small straps 143 of straps 142, which have the same arrangement as that of the straps 125 of the above-mentioned embodiment, are coupled with the corners of the front surface of the airbag 141, and the rear ends of the small straps 143 are inserted into a loop-shaped strap 144.

The strap 144 is formed in a loop-shape by coupling both ends of the belt-shaped strap having a predetermined length. When the internal pressure of the airbag is equal to or less than a predetermined pressure when it expands, the strap 144 surrounds a periphery of the airbag 141 at a rear end thereof similar to the loop-shaped portion 90 formed to the strap 89 of the above-mentioned airbag device 80, thereby restricting the expansion of the airbag 141. Further, the strap 144 is disposed so as to move in approximately forward and backward directions of the airbag 141. Note that the passenger's seat airbag 141 deploys in an approximately cone-shape in which the rear end thereof is made slender in a tapered-shape, which makes it impossible for the strap 144 to move forward from a mid-portion of the airbag 141 on a rear end side thereof when the airbag expands. Thus, the strap 144 can not be removed from a front end side of the airbag 141.

When the internal pressure of the airbag 141 is equal to or less than the predetermined pressure before it expands or at a time it expands, the corners of the front surface side are folded back to the rear end side of the airbag as well as the ends of the straps 142 on the sides thereof where the small straps 143 are disposed are coupled with the strap 144, whereby the corners of the airbag 141 on the front surface side thereof are coupled with the strap 144 through the straps 142.

In the airbag 141, in which the respective corners of the front surface are folded back to the rear end side of the airbag and coupled with the strap 144 disposed at the mid-portion of the airbag on the rear end side thereof through the straps 142, when the internal pressure of the airbag is equal to or less than the predetermined pressure at the time it expands, the respective corners of the front surface of the airbag 141 move forward as the front surface of the airbag 141 is enlarged forward (to an occupant side). However, since the strap 144, with which these respective portions are coupled, does not move forward at the mid-portion of the airbag 141 on the rear end side thereof, the deployment of the respective corners is restricted by the strap 144 through the straps 142. Thus, the respective corners remain as folded back to the rear end side of the airbag.

Further, at that time, the deployment of the airbag 141 is restricted in a state that the rear end side thereof also is narrowed by the strap 144, so that the airbag 141 is expanded rapidly with a small apparent volume.

Then, when the internal pressure of the airbag exceeds the predetermined pressure, the respective corners of the airbag 141 pull the small straps 143 with a force having at least the predetermined value. As a result, tearable portions 145 of the straps 142 are torn to permit the ends of the small straps 143 to be separated from the ends of the straps 142 on the sides thereof where the small straps 143 are disposed, whereby the restriction of the respective corners of the airbag 141 is eased and the front end side of the airbag 141 is largely expanded. Further, as the front end side of the airbag 141 expands, the strap 144 is forced to the rear end side of the airbag 141 where it is made slender, which also eases the restriction of the rear end side of the airbag 141 and permits the airbag 141 to largely expand so as to sufficiently protect the occupant.

Note that this embodiment may be arranged such that tearable portions are provided on both sides of the straps, and when the internal pressure of the airbag exceeds the predetermined pressure, the loops of the straps are increased by tearing the tearable portions. In that case, the strap may be coupled with an airbag at mid-portions thereof. Further, the straps having the above-mentioned other arrangements may be used in place of the strap, or may be arranged differently from them.

As described above in detail, according to the airbag device of the present invention, the airbag is provide with the strap for restricting a deployed-shape of the airbag when it expands, and when the internal pressure of the airbag exceeds a predetermined pressure, the strap is torn so that the length thereof is increased to release or ease the restriction of the airbag. With this arrangement, when the internal pressure of the airbag exceeds the predetermined pressure, the volume of the airbag is increased to prevent the internal pressure of the airbag from being excessively increased. As a result, the impact of an occupant plunging to the airbag can be reliably absorbed as well as the internal pressure of the airbag does not rapidly change just after the occupant plunges to the airbag, and even thereafter the strap is continuously torn to prevent the internal pressure of the airbag from being excessively increased, whereby the impact can be stably and sufficiently absorbed.

While the invention has been explained with reference to the specific embodiments of the invention, the explanation is illustrative and the invention is limited only by the appended claims.

What is claimed is:

1. An airbag device comprising:

an airbag, an inflator for supplying gas to the airbag to expand the airbag, and restriction means for restricting a deployed-shape of the airbag attached to the airbag, said restriction means being a strap having a character to be torn and divided into at least two strap pieces along a pulling direction of the strap so that when the inflator is actuated, the airbag is expanded to a shape restricted by the restriction means, said airbag restricted by the restriction means being gradually released by tearing the strap as an internal pressure of the airbag increases while increasing a length of tearing of the strap along the pulling direction thereof to thereby largely expand the airbag.

2. An airbag device according to claim 1, wherein said strap includes strap sections as parts of the strap extending in a lengthwise direction of the strap, and end sides formed at the strap sections, said end sides being connected to the airbag to allow the strap to be torn in increasing lengths of the strap sections to form the at least two strap pieces.

3. An airbag device according to claim 2, wherein the strap sections are formed by providing a slit from one end side of the strap.

4. An airbag device according to claim 3, wherein said strap is located outside the airbag, one end side of the strap sections being fixed to one side of the airbag and the other end side being fixed to a side opposite to the one side of the airbag.

5. An airbag device according to claim 2, wherein each of the strap sections is formed in a tongue shape.

6. An airbag device according to claim 2, wherein one portion of the strap is connected to a front portion of the airbag, and the other portion of the strap is connected to a rear portion of the airbag, and at least one of the one portion and the other portion of the strap is an end portion of the strap sections.

7. An airbag device according to claim 1, wherein the strap has a slit formed at a mid-portion thereof in a lengthwise direction to form a loop-shaped portion by the slit at the mid-portion, said airbag being inserted into the loop-shaped portion.

8. An airbag device according to claim 1, wherein said airbag has a vent hole, said strap covering the vent hole so that when the strap is torn, the vent hole is opened.

9. An airbag device according to claim 8, wherein said strap has a frame portion fixed around the vent hole, and a strap section located in the frame portion and fixed to a front portion of the airbag.

* * * * *